US012676082B2

(12) United States Patent　　(10) Patent No.: US 12,676,082 B2
Fiaccavento et al.　　(45) Date of Patent: Jul. 7, 2026

(54) SYSTEM FOR PERFORMING SURGERY PRACTICAL EXERCISES

(71) Applicant: B2OR SRL, Brescia (IT)

(72) Inventors: Andrea Fiaccavento, Brescia (IT); Barbara Franzoni, Brescia (IT); Pietro Zola, Brescia (IT)

(73) Assignee: 3-D Technical Services Company, Franklin, OH (US)

( * ) Notice: Subject to any disclaimer, the term of this patent is extended or adjusted under 35 U.S.C. 154(b) by 791 days.

(21) Appl. No.: 17/926,443

(22) PCT Filed: May 21, 2021

(86) PCT No.: PCT/EP2021/063591
§ 371 (c)(1),
(2) Date: Nov. 18, 2022

(87) PCT Pub. No.: WO2021/234133
PCT Pub. Date: Nov. 25, 2021

(65) Prior Publication Data
US 2023/0186787 A1　Jun. 15, 2023

(30) Foreign Application Priority Data

May 22, 2020　(IT) ........................ 102020000012061

(51) Int. Cl.
*G09B 23/28*　(2006.01)
(52) U.S. Cl.
CPC .................................. *G09B 23/285* (2013.01)
(58) Field of Classification Search
None
See application file for complete search history.

(56) References Cited

U.S. PATENT DOCUMENTS 5,149,270 A * 9/1992 McKeown ........... G09B 23/285
434/262
2012/0164616 A1 6/2012 Endo et al.
(Continued)

FOREIGN PATENT DOCUMENTS

WO　2016/191661 A1　12/2016

OTHER PUBLICATIONS

International Search Report dated Aug. 16, 2021, issued in connection with PCT/EP2021/063591.
(Continued)

*Primary Examiner* — James B Hull
(74) *Attorney, Agent, or Firm* — Wood Herron & Evans LLP

(57) ABSTRACT

A portable system for performing surgery practical exercises is disclosed, this system comprising a covering element provided with holes for allowing surgical instruments to pass therethrough, this covering element defining an exercise space therein, and at least one exercise element configured to be arranged and kept in the space, this at least one exercise element having a body which extends three-dimensionally in the space and comprising at least one work portion for the operation by means of the surgical instruments. The covering element is configured to pass from an operational configuration, in which it has a three-dimensional structure and defines the exercise space, to a transport configuration in which this exercise space is substantially cancelled or at least reduced with respect to the operational configuration, and vice versa, and the exercise element is configured to be arranged in the space, defined by the covering element in the operational configuration, according to a plurality of three-dimensional configurations in which the work portion assumes a corresponding plurality of (Continued)

orientations in the directions of this exercise space, allowing a plurality of exercises.

16 Claims, 14 Drawing Sheets

(56) References Cited

U.S. PATENT DOCUMENTS

| | | | | |
|---|---|---|---|---|
| 2014/0051049 | A1* | 2/2014 | Jarc | G09B 23/30 434/267 |
| 2014/0087348 | A1* | 3/2014 | Tracy | G09B 23/285 434/272 |
| 2014/0093854 | A1* | 4/2014 | Poulsen | G09B 23/30 434/272 |

OTHER PUBLICATIONS

Written Opinion of the International Searching Authority dated Aug. 16, 2021, issued in connection with PCT/EP2021/063591.

* cited by examiner

SYSTEM FOR PERFORMING SURGERY PRACTICAL EXERCISES

CROSS-REFERENCE TO RELATED APPLICATIONS

This application is a national phase of PCT/EP2021/063591, filed May 21, 2021, and claims priority to Italian Patent Application No. 102020000012061, filed May 22, 2020, the entire contents of both of which are hereby incorporated by reference.

BACKGROUND

Field of the Application

The present disclosure relates to a system for performing surgery practical exercises, particularly for performing laparoscopic surgery practical exercises, and the following description is made with reference to this application field with the only purpose of simplifying the exposition thereof.

Description of the Related Art

As it is well known, the laparoscopic surgery is increasingly widespread since it is less invasive than the traditional surgery, but it often proves to be challenging for some surgeons who are not used to operating on a monitor and to using uncommon instruments such as for example laparoscopic forceps, needle holders, cameras and the like. Laparoscopic surgery requires in fact the acquisition of psycho-motor skills which are different from those required for traditional surgery, and the greatest difficulties result for example from a limited surgical field, absence of three-dimensional vision, fulcrum effect, modified spatial perception of depth and other factors.

The rapid development and diffusion of non-invasive surgical techniques, such as the above laparoscopic surgery, has caused the diffusion of training tools (simulators) to optimize the learning curve of the operators. Numerous studies have highlighted how operators trained with simulators show superior skills and technical proficiency with respect to operators which had a traditional training.

It is thus increasingly important for professionals and trainees of the field to be able to practise autonomously by means of simulators in order to become familiar with the most modern surgical techniques.

There are several simulation systems, which are essentially divided into two main categories: high-end simulators, having very high costs and numerous functions, and economical simulators, generally with limited functions and a lower cost.

The use of the high-end simulation systems, also called "high-fidelity" since they provide an experience that is as realistic as possible, is limited to university environments or specialized surgical training centres; the use thereof is thus limited by costs, by their availability, by time and by the accessibility to dedicated structures. High-end simulators can thus be used only on certain occasions and are not transportable. Moreover, very often, these high-end simulators do not have a suitable ergonomics to allow a really effective and realistic experience.

A valid low-cost alternative is thus needed for the operators of the field to practise and develop their own laparoscopic skills outside the workplace. However, the existing low-cost simulators do not allow a realistic experience and have many faults. These low-cost simulators are in fact very often too small in size, they allow a very limited number of exercises, and they are not based on an ergonomic study of the shape which allows the trainee a real and effective laparoscopic surgery experience.

Many of the above low-cost simulators are also portable, which allows to practise in any suitable place, although the existing solutions only allow simple and basic exercises, such as managing the most common instruments and practising cutting, without providing a realistic experience for the trainee, as discussed above.

Moreover, in many known solutions being available up to now, especially in those made by means of moulding techniques, the size, weight, and manufacturing costs reduce the product versatility and transportability.

Consequently, nowadays there is no low-cost simulator which meets all the essential requirements to offer an experience which is like the real one. In particular, there is no simulator which has a good portability, which is able to exploit the whole volume thereof with the right surgical geometries in order to respect the correct ergonomics, as well as to provide a tactile feedback in order to make the surgical training experience as realistic as possible.

There is thus the need for systems which allow the operators (e.g., young surgeons) to practise in an effective way the laparoscopic surgery practice, in particular which allow to practise autonomously in order to become familiar with this important surgical practice.

US 2014/0093854 A1 discloses a system for practicing laparoscopic surgical skills comprising a covering element which is removably connected to a base; an anatomical model can be placed in abutment on the base, with limited possible orientations of said anatomical model.

Therefore, it is desirable to provide a system for performing surgery practical exercises which has structural and functional features such as to overcome the limitations and drawbacks of the prior art, in particular which is portable, simple to use and assemble, and at the same time which is able to allow very realistic and effective exercises, also providing a suitable feedback to the operator.

SUMMARY OF THE DISCLOSURE

The present disclosure provides a system having an interlocking and modular structure which includes components which can be easily combined with each other, so as to be easily assembled starting from elements (such as for example thin two-dimensional plates or sheets) that can be easily manipulated in order to form a structure having a three-dimensional cap, and vice versa, obtaining a portable simulator which is able to faithfully reproduce a patient's anatomic portion, in particular the patient's abdomen. The disclosed system is able to house therein exercise elements (such as for example elastically deformable components on which surgical instruments act) to be sutured (or, more generally, operated) by means of laparoscopic instruments introduced through holes suitably made on the cap, the position and the relative spatial relation of the holes corresponding to the real access routes of the main laparoscopic surgery cases. The exercise elements are configured to be arranged at will by using each direction in the three-dimensional space defined inside the cap, for example by exploiting the elasticity of said exercise elements, as well as the possibility of using the holes of the cap for fastening them, thus assuming a plurality of three-dimensional configurations in the space which allow a multitude of exercises. A portable system is thereby obtained which simultaneously offers an extremely realistic experience for the operator, allowing exercises on real cases to be performed thanks to the studied ergonomics of its components, said system respecting the correct laparoscopic ergonomics and permitting a great versatility in the arrangement of the exercise elements to be sutured.

More in particular, an exemplary portable system for performing surgery practical exercises comprises a base element, a covering element provided with holes for allowing the passage of surgical instruments therethrough, said covering element defining an exercise space at the inside thereof, and at least one exercise element configured to be arranged and kept in the exercise space, said at least one exercise element having a body which extends in the exercise space and comprises at least one work portion for the operation with the surgical instruments, wherein the at least one exercise element is configured to be arranged in the exercise space according to a plurality of three-dimensional configurations in which said work portion assumes a corresponding plurality of orientations in the directions (i.e., according to the three-dimensional coordinates) of said exercise space, thereby allowing a plurality of exercises, each three-dimensional configuration comprising one or more specific fastening positions of said exercise element in said exercise space, and wherein the exercise element is configured to be connected to (integrated with) the base element and/or to the covering element according to one or more fastening positions which are located at said base element and/or at said covering element and are selected based on the exercise to be performed in said exercise space, in such a way that the exercise element is configured to be arranged in the exercise space according to a desired arrangement, for example via deformation of one or more portions thereof.

In this way, the fastening positions of the exercise element may be only at the base element, or may be only at the covering element, or may be both at the base element and at the covering element, according to the exercise to be performed. According to an advantageous aspect of the present disclosure, at least one fastening position can be at the covering element, for example at a hole, so that all the space is used.

Advantageously, the fastening positions may be selected according to all the coordinates (e.g., x, y, and z) of the three-dimensional space, permitting a great variety of exercises and therefore to simulate in an easy way many real surgical cases thanks to said exercise element, wherein also the vertical coordinate may be used to integrate the base with the covering element through the exercise element.

More particularly, the disclosure comprises the following additional and optional features, taken individually or in combination if necessary.

In an advantageous embodiment, the exercise element may be at least partially made of an elastically deformable material. Moreover, it may be configured to assume, via deformation of said elastically deformable material (e.g., via deformation of at least one portion of said exercise element), a specific three-dimensional configuration of the plurality of three-dimensional configurations in the exercise space. In other words, the exercise elements comprise portions made of an elastically deformable material which may be deformed to define a particular three-dimensional configuration. In some embodiments, the various portions may be of different materials (e.g., the work portion comprises a first soft elastic material for the operation with the instruments) and other portions (such as elastic threads connected to ends thereof) comprises another elastic material for defining the position of the exercise element in the space. In other embodiments, the exercise element has an integral body made of a single material.

Based on its deformability, the exercise element is thus configured to be integrated in the exercise space (e.g., integrated with the base element and/or with the covering element) according to any desired arrangement depending on the exercise to be performed in said exercise space.

This has also the advantage that the elastic material (e.g., of the work portion of the exercise element but possibly also of the ends thereof) provides an elastic feedback to the operator, operating and/or moving it like a real tissue, providing a realistic experience.

The exercise element may be a modular component comprising a modular body including various portions and integrable in the exercise space in any desired way, connecting it with the base element and with the covering element. For example, it may comprise the above-mentioned work portion (for example having an oval shape), one or more ends projecting from the work portion for associating it to the system (e.g., to the base element, said ends being also possibly deformable), and one or more elastic thread connected to the ends (for example by magnets) for fastening to the covering element.

The exercise element may also a component in which the various portions are integral with each other, for example in which the ends are elongated and can be directly inserted in the holes of the covering element.

In some embodiments, the exercise element may be deformed at one or more end thereof to arrange it in the exercise space.

Generally, the exercise element may comprise elastic portions (such as the ends and/or the elastic thread) which may be deformed to obtain a particular desired configuration in the exercise space based on the exercise to be performed.

According to an aspect of the present disclosure the exercise element may be at least partially made of a polymeric material, preferably silicone.

According to another advantageous aspect of the present disclosure, the covering element may be configured to switch from an operational configuration, in which it has a three-dimensional structure and defines the exercise space (for example in the case that it is folded), to a transport configuration, in which said exercise space is substantially cancelled or at least reduced (for example in which the covering element has a substantially two-dimensional development or extension, e.g., it is plate-shaped) with respect to the operational configuration or in any case modified with respect to the operational configuration, and vice versa. Therefore, starting from a single plate, the covering element is configured and shaped to assume a folded configuration in which it is folded and defines the exercise space therein.

It can also be said that in the operational configuration the covering element defines a first volume and in the transport configuration it defines a second volume which is different from the first volume, particularly smaller, where this second volume is preferably zero.

According to an aspect of the present disclosure, the work portion of the exercise element may be shaped to be sutured by means of the surgical instruments to be inserted in the holes of the covering element. For example, the work portion to be sutured can comprise at least one non-through cavity or recess which separates edges adapted to be sutured from each other.

According to an aspect of the present disclosure, the exercise element may be configured to undergo a plurality of different tensile stresses, each tensile stress corresponding to a fastening three-dimensional configuration in the exercise space and thus to an exercise to be performed by the system of the present disclosure, by deformation of the body thereof. For example, by deforming, the exercise element can assume the tension required to perform a particular exercise.

According to an aspect of the present disclosure, the exercise element may comprise at least one end for the housing thereof in the exercise space. In particular, the exercise element may comprise a plurality of ends (for example four ends) independent from each other and configured to allow the housing of said exercise element in said exercise space.

According to an aspect of the present disclosure, at least one end of the exercise element (more generally a portion of the exercise element) is configured to be inserted in one of the holes of the covering element for the housing of said exercise element in said exercise space.

According to another aspect of the present disclosure, the exercise element may also comprise at least one elastic thread at at least one end thereof, said elastic thread being configured to fasten said exercise element to the covering element by being inserted inside a respective hole.

According to another aspect of the present disclosure, the exercise element may be kept hanging inside the exercise space, in any three-dimensional position in this space.

According to an aspect of the present disclosure, the system may comprise a support base (e.g., supporting the above-mentioned base element or being itself the base element) and a frame connected to the support base, the covering element being supported by said frame, in particular when it is in the operational configuration.

According to an aspect of the present disclosure, the system may comprise an exercise plate arranged in the exercise space (for example in a plane of the exercise space) and being the base element of said exercise space.

According to an aspect of the present disclosure, the exercise plate may be configured to provide an abutment plane for the exercise element, and it may be at least partially made according to a hook-and-loop configuration and may be adapted to provide a frictional force to the exercise element. According to another additional or alternative aspect of the present disclosure (for example in a case where the exercise plate is split into different sections), the exercise plate may be configured to provide an abutment plane for the exercise element and said exercise element may be coupled thereto by magnetic coupling.

According to an aspect of the present disclosure, the exercise plate may be removably associated with said system.

According to an aspect of the present disclosure, the exercise plate may be configured to show spatial references (i.e., it comprises spatial references) for arranging the exercise element inside the exercise space, said spatial references corresponding to surgical exercises to be performed in said system, wherein the position of the holes of the covering element is related to the arrangement of the spatial references and said relation is selected to allow only specific surgical accesses via specific holes based on the position of the exercise element arranged according to said spatial references, allowing a correct application of the surgical instruments on the work portion of the exercise element only via said specific holes when the exercise element is arranged according to said spatial references, respecting the correct ergonomics. The spatial references thus correspond to surgical exercises to be performed in the system. The exercise is thereby correctly performed only if particular accesses corresponding to the real abdominal cases are performed.

According to an aspect of the present disclosure, the holes of the covering element may house respective bushing elements provided with openings configured to allow the passage of the surgical instruments and a simultaneous elastic holding thereof.

According to an aspect of the present disclosure, the covering element may be shaped as a patient's abdomen in the operational conditions of laparoscopic surgery, and the arrangement of the holes of said covering element may match the main surgical accesses of the laparoscopic surgery, said holes being arranged to each other such that specific accesses correspond to specific laparoscopic exercises.

Advantageously, the correct access of the surgical instruments is possible only via specific selected holes; each exercise to be performed corresponds to specific access holes and not all the holes may be correctly used. This may be accomplished by selecting a specific relation between the holes and the base element (e.g., via the above-mentioned spatial references), or in any other suitable way.

According to an aspect of the present disclosure, the system may comprise a vision system (such as a high-resolution camera or a webcam or any other suitable means, such as a smartphone) configured to monitor the exercise element inside the exercise space and to capture images and/or video.

According to an aspect of the present disclosure, the system may comprise a control unit operatively connected to the vision system and configured to process the images captured by said vision system and, based on said captured images, configured to monitor the closing operation of the recess of the work portion to be sutured via the surgical instruments, so as to estimate the execution of a suture performed on the exercise element.

According to an aspect of the present disclosure, the recess has a colour or a colour tone (or more generally a visual aspect/feature) different with respect to the rest of the body of the exercise element, and wherein, based on the images captured by the vision system, the control unit is configured to discriminate between the different colours or colour tones (or more generally the visual aspects/features) of the exercise element and to verify whether the colour or colour tone of the recess is disappeared, the disappearance of the colour or colour tone corresponding to the completion of the suture.

According to an aspect of the present disclosure, the control unit may be configured to allow the access to an exercise interface adapted to send data related to the exercise performed in the space for sharing said data over the network on a dedicated platform, and/or for receiving data related to an exercise performed by other users on another system, as well as to display the inside of this exercise space.

According to an aspect of the present disclosure, the system may comprise at least one surgical instrument for performing exercises in said system, and a case provided with transport means of the components of this system, wherein said system is configured to be foldable and transportable inside the case when the covering element is in the transport configuration.

The present disclosure also relates to a method for assembling a system for performing practical surgery exercises, the method comprising the steps of providing an essentially bidimensional plate, said plate being equipped with holes, folding said plate so as to firm a covering element having a three-dimensional structure which defines an exercise space at the inside thereof, arranging an exercise plate in the exercise space defining a base element thereof, wherein said exercise plate comprises spatial references for arranging an exercise element inside the exercise space, and based on the spatial references of the exercise plate, arranging at least one exercise element in the exercise space, said at least one exercise element having a body which extends in the exercise space and comprises a work portion on which, during the exercises, surgical instruments introduced in the holes act, wherein the exercise element is arranged in the exercise space according to the spatial references of the exercise plate, said spatial references corresponding to surgical exercises to be performed in said system, wherein the position of the holes of the covering element is related to the arrangement of the spatial references and said relation is selected to allow only specific surgical accesses via specific holes, allowing a correct application of the surgical instruments on the work portion of the exercise element only via said specific holes, when the exercise element is arranged according to said spatial references, and wherein arranging the exercise element comprises selecting a three-dimensional configuration of a plurality of three-dimensional configurations in which said work portion assumes a corresponding plurality of orientations in the directions (i.e., according to the three-dimensional coordinates) of said exercise space, thus allowing a plurality of exercises.

The features and advantages of the system according to the disclosure will become apparent from the following description of an embodiment thereof, given by way of non-limiting example with reference to the accompanying drawings.

DETAILED DESCRIPTION

With reference to those figures, a system for performing surgery practical exercises according to the present disclosure is globally and schematically indicated with the reference number 1.

It is worth noting that the figures represent schematic views and are not drawn to scale, but instead they are drawn so as to emphasize the important features of the disclosure. Moreover, in the figures, the different elements are depicted in a schematic manner, their shape varying depending on the application desired. It is also noted that, in the figures, the same reference numbers refer to elements that are identical in shape or function. Finally, particular features described in relation to an embodiment illustrated in a figure are also applicable to other embodiments illustrated in the other figures.

It is also noted that, when sequences of process steps are illustrated, they do not necessarily follow the indicated sequence, and these steps may be inverted unless the opposite is expressly indicated.

The system 1 of the present disclosure will be illustrated hereafter as intended to be used for practical exercises of laparoscopic surgery, although the teachings of the present disclosure are theoretically applicable also in other applications, such as for example otolaryngology or thoracic surgery.

Still more particularly, the system 1 will be illustrated according to a preferred application wherein, during the execution of the laparoscopic surgery exercises, the execution of a suture is performed, although also other types of exercise are possible. It is known that, in laparoscopy, the correct execution of a suture is the highest expression of the movement control of the operator, for which reason it is extremely important to design a system allowing to practise the suture execution in an effective way. In other words, a preferred and non-limiting example will be illustrated hereafter, wherein the system 1 of the present disclosure is used to practise the suture execution in laparoscopy.

Moreover, it is observed that the system of the present disclosure is theoretically applicable also to robotic surgery, wherein the instruments are used by robots.

Figures 1A, 1B, 1C:
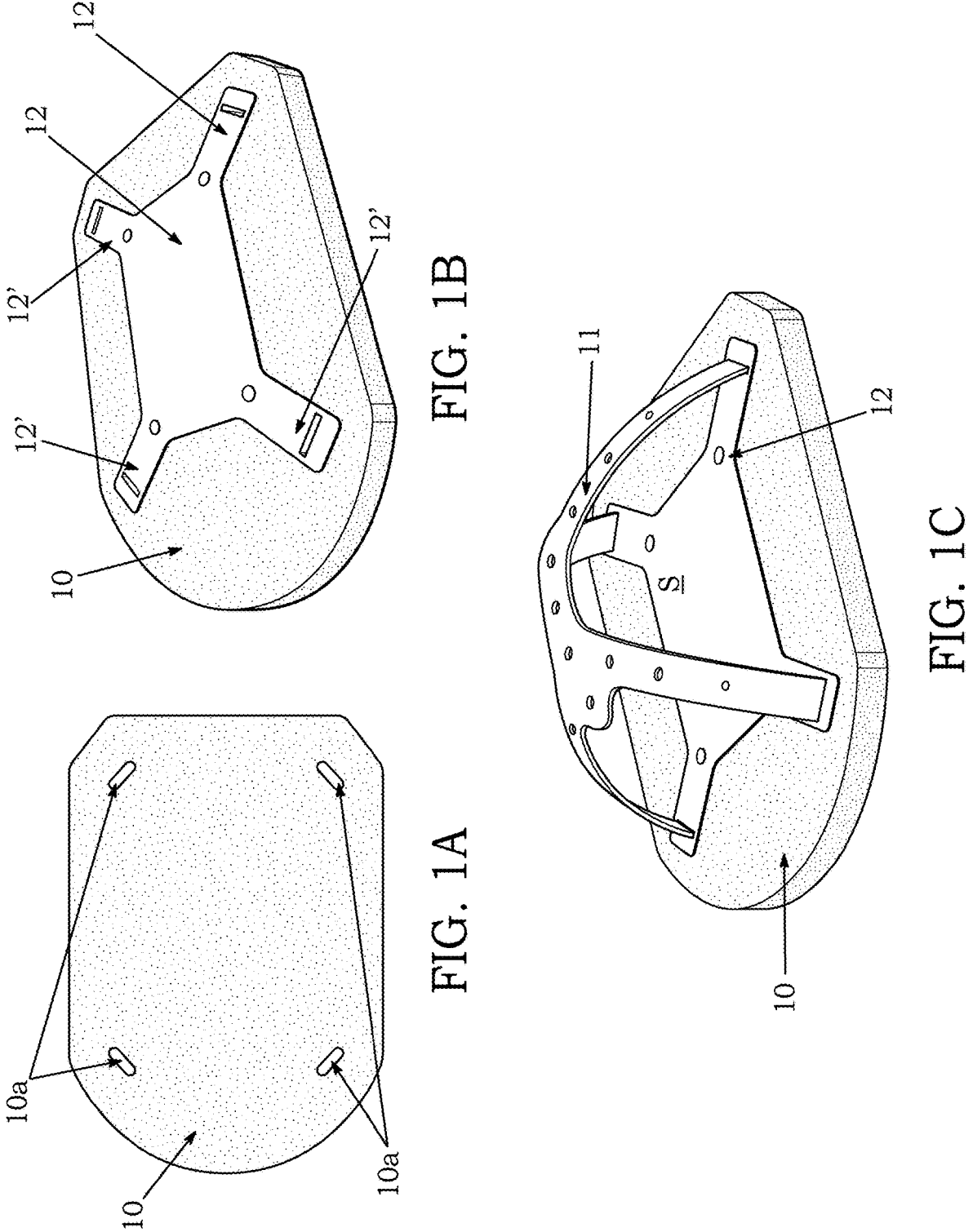
FIGS. 1A-1C schematically show elements of a system for performing surgery practical exercises according to the present disclosure.

With reference to FIGS. 1A-1C, the system 1 comprises a support base 10 and a frame 11 connected to the support base 10. The support base 10 and the frame 11 thus form the main support structure of the system 1 of the present disclosure. The support base 10 may support other base elements (such as interchangeable exercise plates, as it will be disclosed in the following), in some embodiments.

In an embodiment, the support base 10 is formed starting from a plate of EPDM foamed material, and the frame 11 is made of polycarbonate, although other materials are obviously possible. By way of example, the support base 10 can have a thickness of about 20 mm, a value which is sufficient to ensure the correct operation of the system 1, and the frame 11, which represents the bearing structure of the system 1, is preferably obtained from a 3 mm poly carbonate sheet (plate).

In an embodiment, the frame 11 comprises a central body and four portions or arms which extend from this central body, forming a tensile structure which is elastic and strong.

In an embodiment of the present disclosure, moreover, there is a stiffener or support element 12 of the frame 11, as it can be seen in FIGS. 1B and 1C. The support base 10 comprises four slots or housings 10a which serve as a reference for the positioning of the support element 12 and which allow ends of the four portions of the frame 11 to be housed therein. In particular, in this embodiment, once the support base 10 is positioned on a plane, the support element 12 is coupled thereto at the four slots 10a, this support element 12 comprising four corresponding cuts into which the ends of the frame 11 are inserted as illustrated in FIG. 1C. By inserting the ends of the frame 11 into the slots 10a through the cuts of the support element 12, the fastening both of the frame 11 and of the support element 12 is thereby obtained.

In a non-limiting embodiment of the present disclosure, the support element 12 is shaped as a plate equipped with four ends 12' projecting at the vertices of the plate, the above cuts being made in each of said ends 12' for the passage of the ends of the frame 11. The support element 12 can be obtained from a 3 mm polyethylene sheet, although other solutions are not excluded.

In general, it is noted that the shapes, size, and materials used, although they are selected to optimize the performances of the system 1, do not limit the scope of the present disclosure, which does not exclude also other possible suitable configurations.

Figure 2:
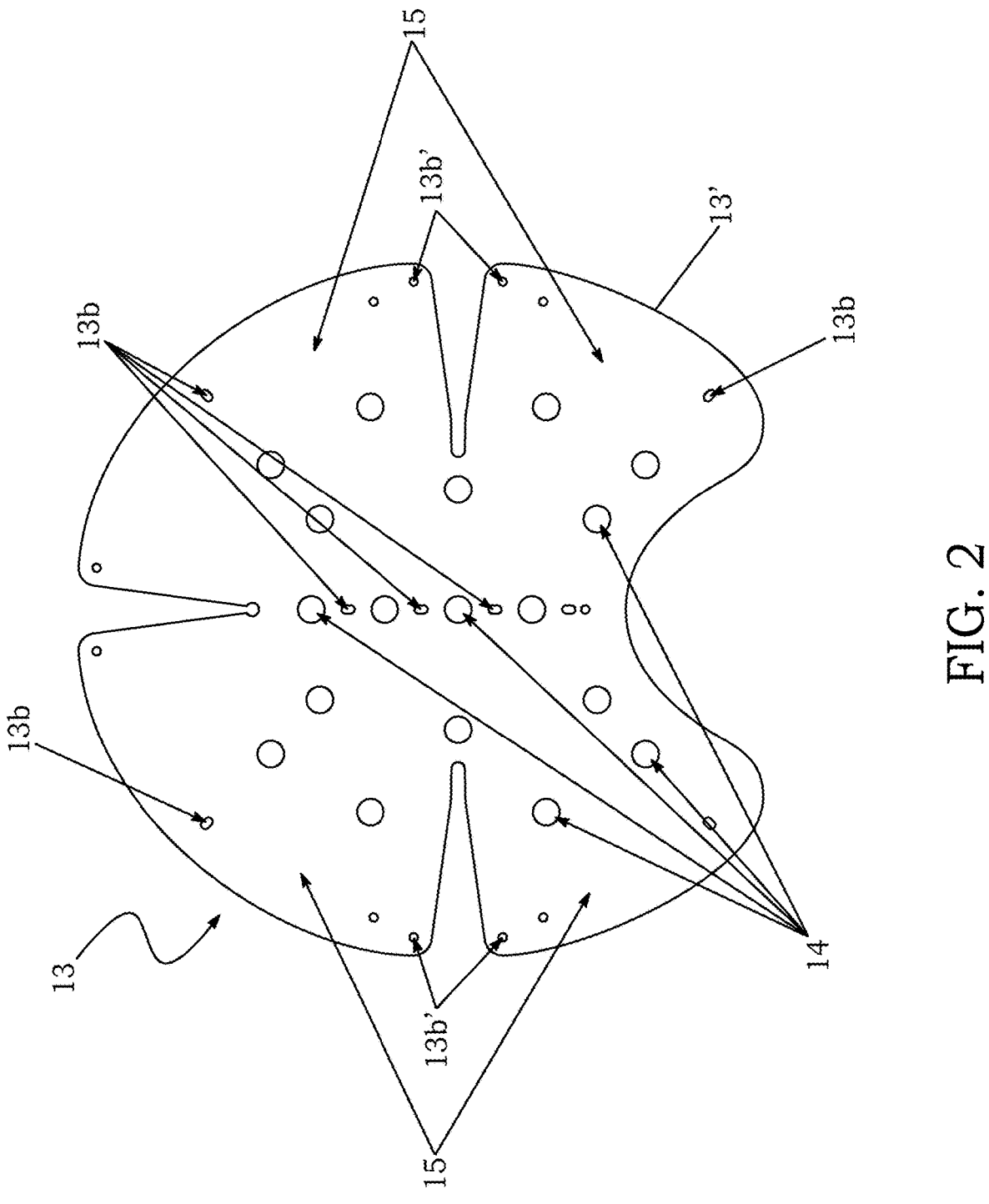
FIG. 2 schematically shows a plate which forms a covering element of the system of the present disclosure.
Figure 3:
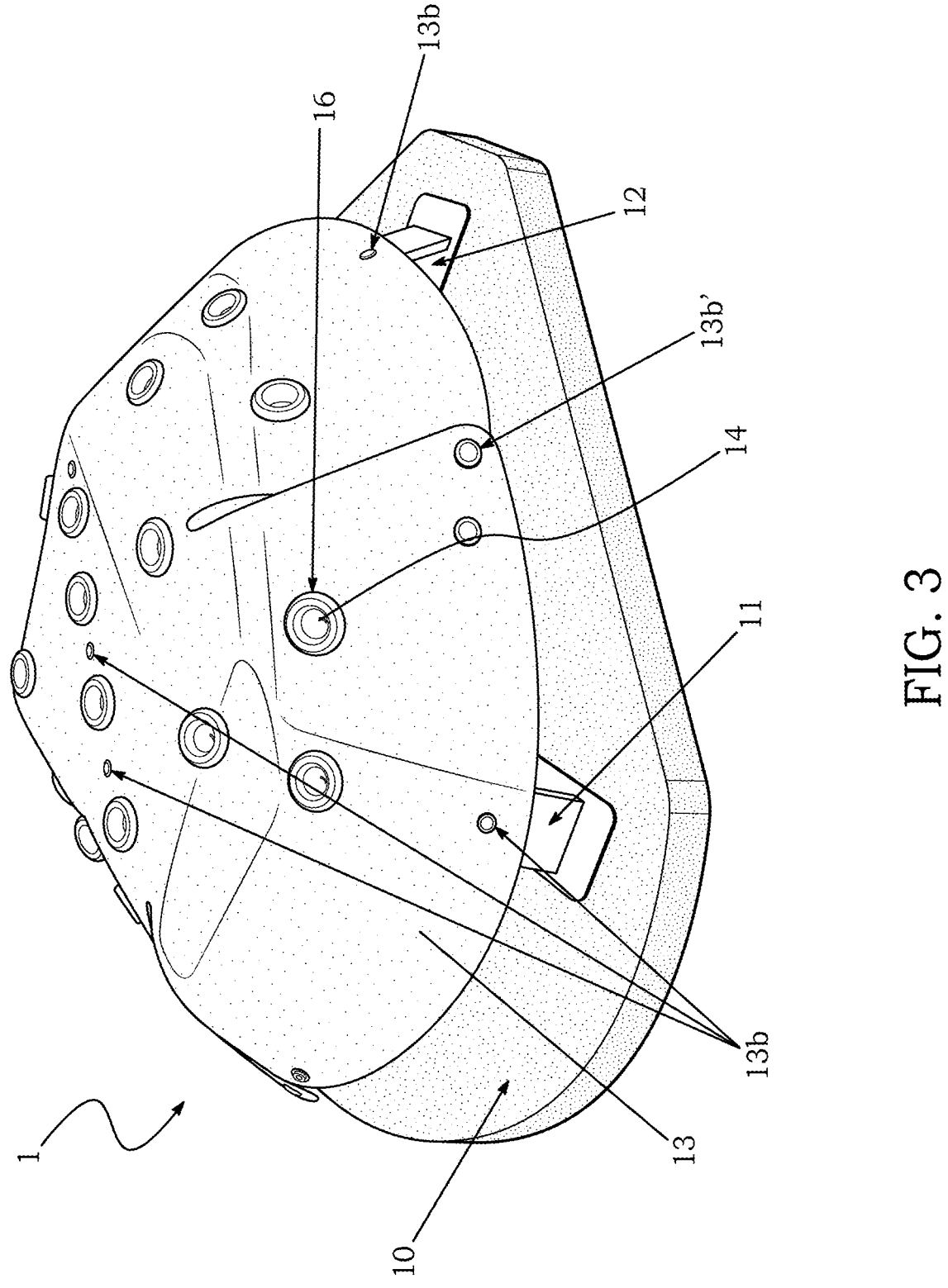
FIG. 3 shows a perspective view of the system according to the present disclosure.
Figures 4A, 4B, 4C, 4D:
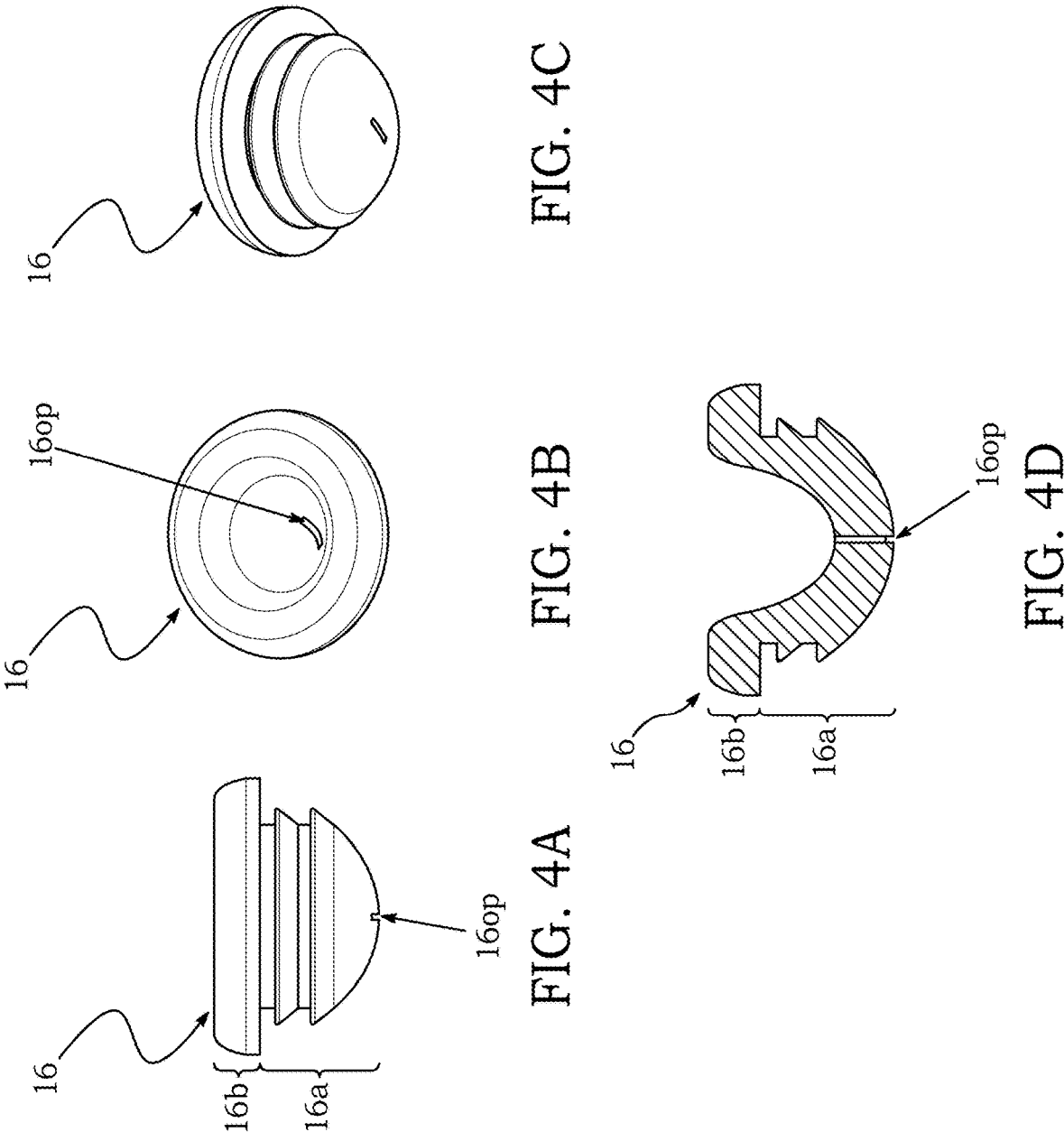
FIGS. 4A-4D show different views of a bushing element housed in holes of the covering element of the system of the present disclosure.

As illustrated in FIGS. 2 and 3, the system 1 further comprises a covering element or shell 13, which is provided with holes 14 for allowing surgical instruments T to pass therethrough. As it will be evident from the following description, the covering element 13 is a fundamental component of the system 1.

The covering element 13 is the cap of the system 1, and defines inside it a space or volume S, herein indicated as "exercise space". Once assembled, the covering element 13 is able to enclose therein other components of the system 1.

The covering element 13 is supported by the frame 11, to which it is fastened by means of suitable snap buttons 13b, although other embodiments are not excluded wherein the covering element 13 is self-supporting and the frame 11 is not used.

In an embodiment, the covering element 13 can be obtained from an Opal polyethylene (opalescent polyethylene) sheet (or plate), for example with a thickness of 1 mm, and it may be suitably shaped in order to form the cap of the system 1 of the present disclosure. FIG. 2 shows an example of shaped plate 13', which represents the main body of the covering element 13.

Suitably, the covering element 13 is configured to switch from a first configuration, also called transport configuration, in which the exercise space S is substantially cancelled and in which said covering element 13 has a substantially two-dimensional development (i.e., it is shaped as a plate 13' with a reduced thickness, as illustrated in FIG. 2), to a second configuration, also called operational configuration, in which it has a three-dimensional structure and defines by means of its own inner volume the exercise space S (as illustrated in FIG. 3) and it is connected to the support base 10, and vice versa. This is particularly advantageous since it makes the system 1 of the present disclosure portable, and thus easily transportable from one place to the other, rapidly passing from a two-dimensional plate 13', which can be nimbly arranged in a bag, to a three-dimensional volume when the user wants to practice. In other words, in the operational configuration, the covering element 13 defines a first volume and, in the transport configuration, it defines a second volume which is different from the first volume, particularly smaller, even more particularly zero.

In an embodiment of the present disclosure, in order to make the assembly and disassembly easier, the covering element 13 is equipped with pre-cut edges (or flap) 15 (for example four edges 15 as can be seen in FIG. 2) which make this element easily foldable. In this embodiment, the particular shaping gives the covering element 13, in the two-dimensional transport configuration, a petal-like shape with suitable cuts for folding.

During the assembly, the edges 15 are fastened to each other form example by means of suitable snap buttons 13b', obtaining, starting from a two-dimensional element, the above three-dimensional cap which reproduces in shape, size and proportions a patient's abdomen, as illustrated in FIG. 3.

More particularly, according to the main application of the system 1 of the present disclosure, the covering element 13 is shaped so as to reproduce the patient's abdomen after the insertion of CO2, as it occurs in real laparoscopy operations, so as to have the geometry and ergonomics of the abdomen which is found in real operations. A portable simulator is thereby obtained which allows a work volume to be easily moved from one place to the other, and thus such as to allow to practise also outside specialized structures, this work volume reproducing a human abdomen having a substantially real size with (also in case of insertion of 3-4 litres of CO2) allowing exercises which are as realistic as possible to be performed.

In other words, in an embodiment of the present disclosure, the covering element 13 is a pre-drilled cap which is connected to the frame 11 to reproduce a patient's abdomen. As illustrated above, the starting plate is fastened onto the frame 11 by suitable buttons to be pressed on this frame 11, which supports the covering element 13 when it is in the operational configuration. The fastening of the shaped edges 15 to each other (which is performed by suitable buttons, for example) allows to easily switch from a two-dimensional shape to a cap-like three-dimensional shape which reproduces in its shape and size the actual volume of the abdominal-pelvic surgical field, at the same time keeping this structure stable. The assembly operation is thus extremely simple and rapid (it can require even less than one minute).

Other embodiments are also possible, for example in which, in the transport configuration, the covering element is not necessarily a two-dimensional plate, but it may be for example suitably folded (so as to cancel or at least reduce the space S), in any case so as to be easily transported.

As mentioned above, suitably, the covering element 13 comprises holes 14 configured to allow, in the operational configuration in which it is shaped as a patient's abdomen, the insertion of laparoscopic surgical instruments T into the space S. The position of the holes 14 is suitably selected to reproduce the main surgical access ways of the real abdominal cases of laparoscopy, in full real scale with all the correct dimensional relationships. The number and positioning of the holes 14 is such as to allow the instruments T (i.e., to the operator using the instruments T) to impact on the system 1 (in particular on the covering element 13) with the required correct angle, thus respecting the correct ergonomics. In other words, the correct ergonomics is respected thanks to the arrangement of the holes 14 (and also thanks to the shape of the covering element 13), wherein their relative position allows to correctly practise only through certain accesses.

Furthermore, the holes 14 of the covering element 13 house respective bushing elements 16 (which are illustrated in detail in FIGS. 4A-4D), which substantially act as plugs of these holes 14. The bushing elements 16 are equipped with suitable openings configured to allow the passage of the instruments T therethrough (and thus through the holes 14) and a simultaneous elastic holding thereof.

As illustrated in FIGS. 4A-4D, the bushing elements 16 are provided with a body (which is made for example of a suitable elastomer) which comprises a first portion 16a to be housed in the holes 14 and a second portion 16b which externally protrudes from these holes 14 with respect to the space S. In this embodiment, the passage of the instruments T occurs through a suitable opening 16op (for example, a cut) made on the bottom of the first portion 16a of the elastomeric body of the bushing elements 16, as can be seen in the section shown in FIG. 4D. The holding of the bushing elements 16 in the holes 14 is obtained by means of a particular conformation of the external wall thereof, said external wall comprising projections and recesses being able to provide the required grip against the wall of the holes 14, wherein the bushing elements 16 have, at the projections, a greater diameter than the one of the holes 14.

In an embodiment of the present disclosure, the bushing elements 16 have an elasticity which is comparable to the elasticity that is typical of the surgical inlets in laparoscopy, thus providing a suitable elastic feedback to the operator. The required elasticity of the inlets is thereby suitably ensured for performing the exercise (for example a suture) and therefore for obtaining a very realistic experience for the operator which uses the system 1 of the present disclosure.

By way of example, the bushing elements 16 are made of EPDM, or more preferably of silicone. In general, what matters is that the material, size and shape adopted are such as to make the user experience as similar as possible to the real one. All this, together with the above arrangement of the holes 14 of the covering element 13, allows the exercises to be performed with the correct impact angle, respecting the ergonomics. Moreover, the bushing elements 16 ensure a perfect control of the instrument T inserted into their openings 16$op$, thanks to the elastic material used.

In an embodiment, the hushing elements are made of a self-lubricating material.

In an embodiment, the system 1 may also comprises an additional component that may be coupled with the bushings 16 for facilitating the exercise and making the experience more realistic. More in particular, a stub pipe (which may be very small in size) may be used, wherein the instrument T is firstly inserted in said pipe and then this pipe is introduced, via the instrument, into the hushing element. The pipe may be made of nylon. This solution frees up the choice of hushing material.

In an embodiment of the present disclosure, there are eighteen holes 14 which, as a whole, offer a great versatility and the possibility of different approaches. Obviously, also other configurations are possible, and the present disclosure is not limited to the above-described embodiments.

Figure 5:
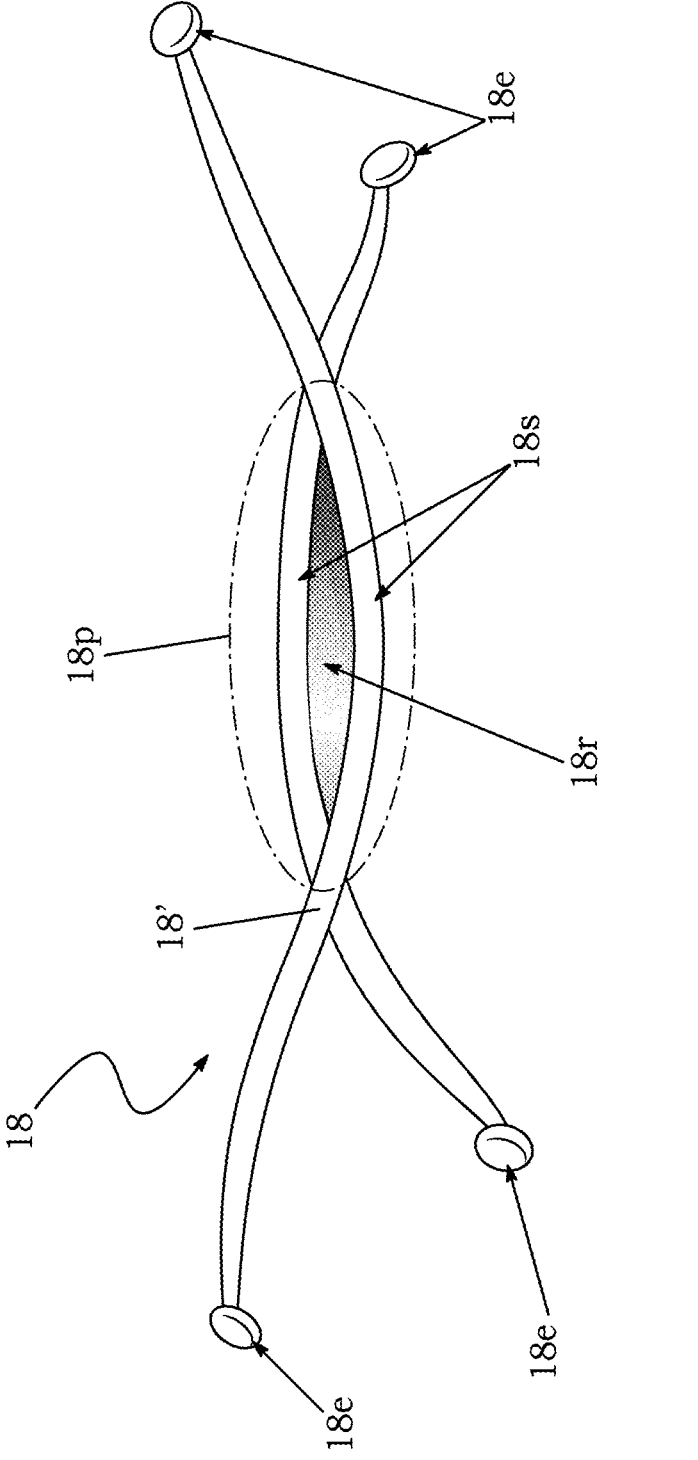
FIG. 5 shows an exemplary exercise element of the system of the present disclosure.

Referring now to FIG. 5, the system 1 further comprises at least one exercise element 18 configured to be arranged and kept in the space S inside the covering element 13. The exercise element 18 is equipped with a body 18' which extends (develops) three-dimensionally in the space S and comprises a work portion 18$p$ on which the surgical instruments T act. In other words, the work portion 18$p$ is the portion on which the exercise is performed. FIG. 5 illustrates the exercise element 18 according to an embodiment of the present disclosure, although it is not limited to this particular shape. Moreover, it is noted that, when the covering element 13 is in the transport configuration, the space S is not able to house the exercise elements 18 therein. The work portion 18$p$ can be arranged in any position on the exercise element 18 is not limited by a particular shape. In some embodiments, the work portion 18$p$ may also coincide with the whole exercise element 18.

In a preferred embodiment of the present disclosure, the work portion 18$p$ of the exercise element 18 is a portion to be sutured, i.e., it is shaped to be sutured by the surgical instruments T to be inserted into the holes 14 of the covering element 13. For example, as illustrated in FIG. 5, the work portion 18$p$ to be sutured comprises at least one recess (called also non-through cavity) 18$r$ which separates from each other edges 18$s$ adapted to be sutured. Obviously, also other embodiments of the exercise elements 18, which allow to practise different techniques, are possible, and the present disclosure is not limited by a particular configuration thereof.

Referring again to FIG. 5, the exercise element 18 comprises a plurality of ends 18$e$, for example four ends, which are independent from each other and configured to allow it to be housed in the exercise space S. In the context of the present disclosure, the ends 18$e$ of the exercise element 18 are part of the body 18' thereof, in particular are the terminal part of said body 18'.

Figure 6A:
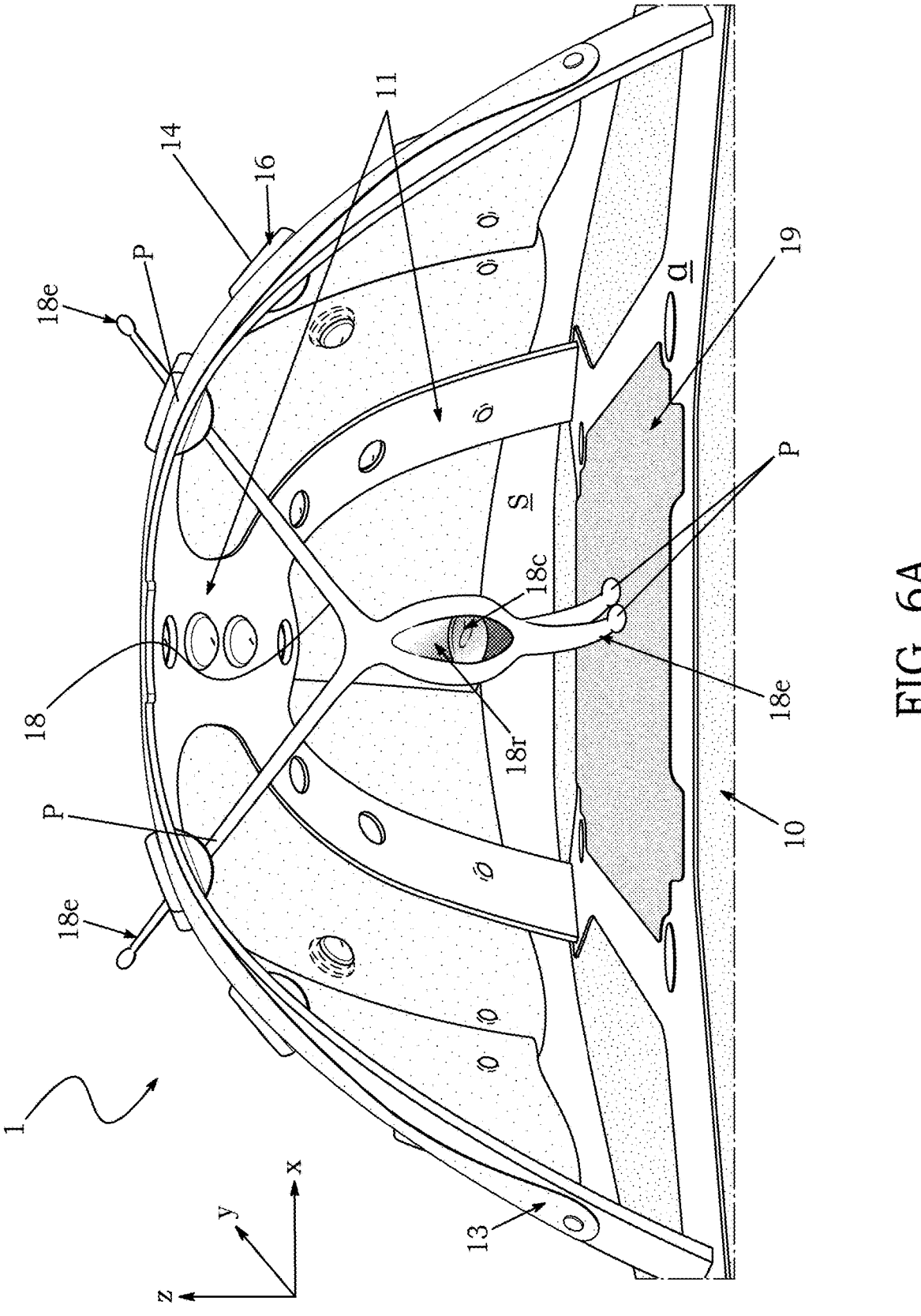
FIGS. 6A-6B show the inside of the system of the present disclosure with exercise elements arranged according to two different three-dimensional configurations.

It is also possible to provide the work portion 18$p$ with further elements 18$c$ to be removed by the instruments T before executing the suture, as can be seen in FIG. 6A, in this way offering a further exercise.

Figure 6B:
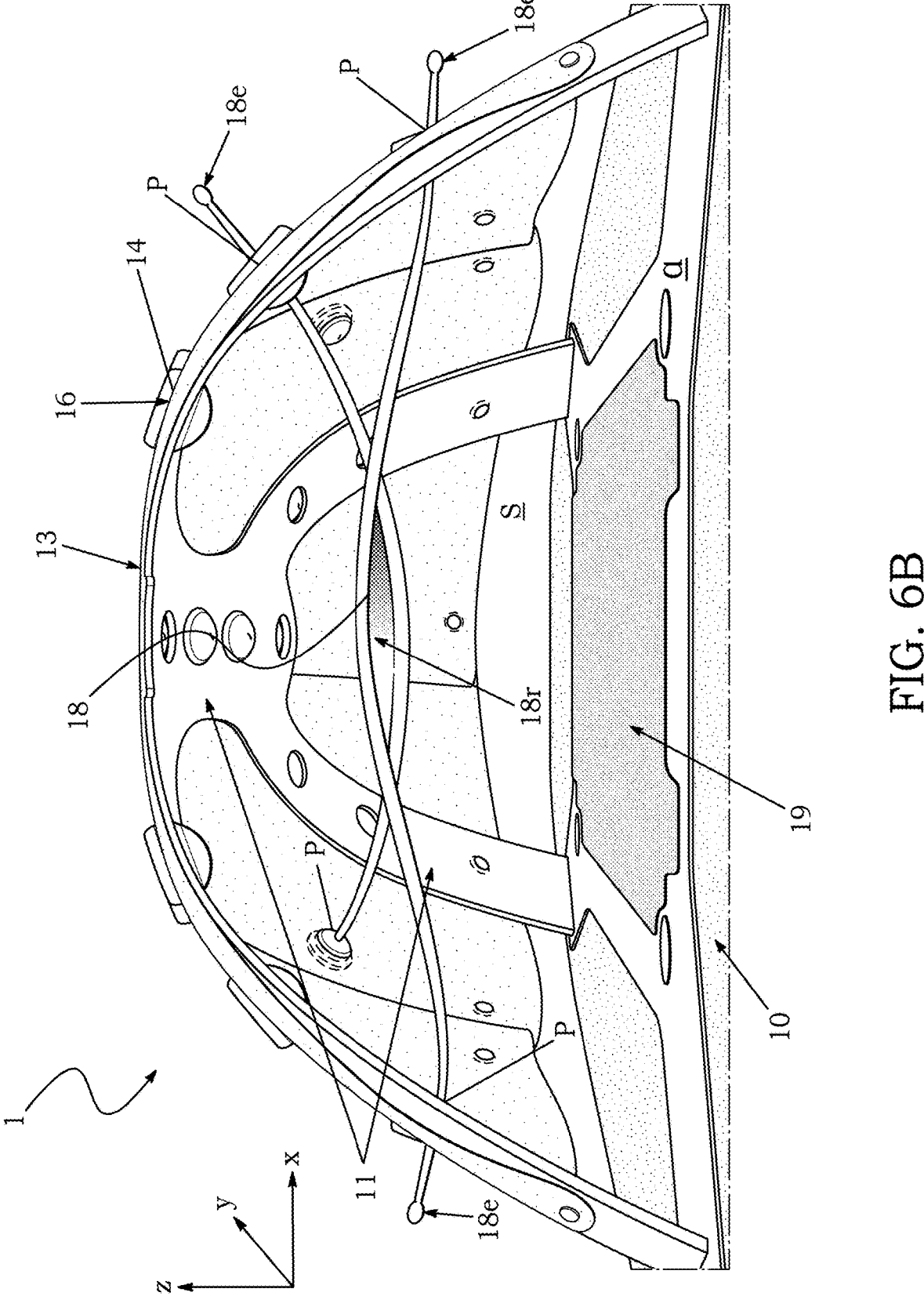

Advantageously according to the present disclosure, as can be observed in FIGS. 6A and 6B, the exercise element 18 is configured to be arranged in the space S according to a plurality of three-dimensional configurations (or arrangements), in which the work portion 18$p$ assumes a corresponding plurality of orientations in the three dimensions of this space S, i.e. according to the three-dimensional coordinates x, y, z thereof (namely, the directions x, y, and z), allowing a plurality of exercises to be performed by the use of a single exercise element 18.

In other words, the particular conformation (e.g., shape and material) of the exercise element 18 allows a plurality of orientations thereof in the space, thanks to the three-dimensional development of the work portion 18$p$ (e.g., of the portion to be sutured), obtaining an extremely dynamic system. Starting from a single exercise element 18, it is thereby possible to perform a plurality of different exercises just by varying the arrangement thereof in the space, with modes which will be illustrated hereafter.

In an embodiment, the combination of the shape and the material of the exercise element 18 allows the aforementioned great flexibility and the possibility of arranging said exercise element 18 in any position inside the exercise space S, obtaining a great number of exercises starting from a single exercise element.

In this way, the exercise element 18 may be integrated into the exercise space S with the other components of the system 1 in any suitable way, allowing infinite combinations of exercises due to the infinite possibility of arranging said exercise element 18. The shape and materials of the exercise element 18 therefore allows to arrange it in any direction inside the exercise space S of the system 1.

The present disclosure thus provides the possibility of exploiting all the spatial coordinates to fasten the exercise element 18 inside the space S (i.e. using the whole three-dimensional space in the cap, and thus possibly selecting, besides the plane, also a desired vertical coordinate z), and it thus allows the drawbacks of some known solutions, which only provide a simple abutment on a plane, to be overcome, offering a high realism of the surgical simulation, without renouncing to the ease and simplicity of assembly of the system.

Suitably, in this way the various arrangements in the directions of the space S correspond to the anatomical positions of elements to be surgically corrected (or generally to be operated) by the surgical instruments T, and all this position may be obtained by an exercise element configured as disclosed herein.

In a preferred embodiment of the present disclosure, the exercise element 18 is made of an elastically deformable material and it is configured to assume, by an elastic deformation of said elastically deformable material (e.g., of the body), a particular three-dimensional configuration among the various possible configurations in the space S. The operator is therefore able to select the particular desired configuration of the exercise element 18, and thus the particular exercise to be performed, by simply deforming the elastically deformable material (e.g., the body 18' of the exercise element, for example by elongating it, stretching it, compressing it, etc.).

Clearly, the presence the presence of the elastically deformable material does not exclude the presence of other materials (such as magnets at the ends 18e), as well as the possibility of using multiple elastically deformable materials, in some embodiments.

In other words, the exercise element 18 may comprise various portions (which may be integral with each other or connected in suitable ways) that can be elastically deformed at will, depending on the exercise to be performed.

The deformability of the exercise elements 18 further allows a particular desired tension to be selected, which has an extremely positive effect on the execution of the exercise.

By way of example, the exercise elements 18 (in particular the body—ends included—thereof) are made of soft rubber, silicone, or foamed silicone, but they are not limited by the used material and many materials may be used; what matters is that it has an elastically deformable body.

In an embodiment, the exercise element 18 is thus configured to undergo a plurality of different tensile stresses, each tensile stress corresponding to a particular three-dimensional fastening configuration in the space S, providing a specific feedback to the operator. It is thus evident that the conformation of the exercise element 18 allows a plurality of configurations thereof.

The present disclosure thus provides that the exercise element 18, on which the operators practise, is arranged in the space S at will depending on the required configuration: this can involve the deformation of the body 18' of said exercise element 18 and/or the fixation thereof in a plurality of positions at will in the space S.

In particular, the three-dimensional configurations of the exercise element 18 in the space S comprise fastening positions P arranged in said space S according to different three-dimensional coordinates, i.e., the fastening preferably occurs in the three dimensions, wherein the fastening positions P are not arranged only on a plane, but the whole three-dimensional space inside the covering element 13 is exploited, including the covering element 13 itself.

Obviously, there is nothing to prevent that the exercise elements 18 are arranged in the space S by means of abutment of the ends 18e thereof on the plane, but what matters is that they are such as to be fastened in each three-dimensional point of the space according to various desired three-dimensional fastening configurations, i.e. exploiting a corresponding plurality of three-dimensional fastening coordinates in said space S which vary from a configuration to the other, for example by using both an abutment base and the covering element 13, or also only the covering element, in some embodiments.

Advantageously, at least one fastening position P may also be at the covering element 13, so that it is possible to use the cap itself for fastening the exercise elements 18.

The plurality of configurations in all directions in the space is thus obtained both by a suitable modelling of the elastically deformable exercise elements 18 (which also may allow the desired tension to be imposed to said exercise elements 18), and by the possibility of arranging them at will in the space S also by exploiting the holes 14 of the covering element 13, assuming said plurality of positions.

All this ensures an improved simulation with respect to the existing systems, with an extremely realistic operation reproduction in which, starting from a two-dimensional plate, a portable system is obtained which allows the displacement of a volume from one place to another, this volume simulating the one of the abdomen and of the pelvic zone with insufflation of 3-4 litres of $CO_2$, as it occurs during the real operations.

In general, the transportability of the system is obtained thanks to the possibility of modifying (in particular reducing, preferably cancelling) the volume of the covering element 13, wherein, under the maximum volume condition, the exercise elements 18 are associated with great versatility.

In an embodiment of the present disclosure, the system 1 further comprises an exercise plate 19 which is arranged in a plane α in the space S and defines a base element of this space S. As illustrated in FIGS. 6A and 6B, the exercise plate 19 is arranged on the support base 10 and it is shaped as a sheet, which is not limited to a particular material and to a particular shape.

The exercise plate 19 is adapted to provide an abutment plane for the exercise element 18 and, in a non-limiting embodiment of the present disclosure, it is made of at least partially of a hook-and-loop fastener in order to provide also a frictional force to this exercise element 18 abutting thereon, in particular to the ends 18e thereof.

As an alternative, the exercise element 18 may be coupled to the exercise plate 19 by magnetic coupling. For example, it is possible to use an exercise plate 19 made of steel, or at least comprising portions of steel or other metals, and an exercise element 18 having a magnet associated with the ends 18e thereof, or at least with one of the ends 18e thereof.

As illustrated in FIG. 6A, some ends 18e of the exercise element 18 can be arranged at the support base 10, more particularly on the exercise plate 19, which is thus adapted to contact said ends 18e and to ensure the abutment thereof, both in the case of the hook-and-loop fastener and in the case of magnetic coupling.

Advantageously according to the present disclosure, at least one end 18e of the exercise element 18 can be inserted in one of the holes 14 of the covering element 13 to ensure the housing of said exercise element 18 in the space S. In this case, the presence of the hushing elements 16 ensures the correct holding of the exercise element 18, providing the latter with the required grip; suitably, this grip in the interaction between the exercise element 18 and the bushing element 16 (as well as the material of the exercise elements) enables an improved positioning of said exercise element 18, for example allowing to select the desired tension to obtain the desired configuration.

According to the present disclosure, it is thereby possible to have fastening positions P both at the exercise plate 19 (or more generally at a base element) and at the holes 14 of the covering element 13, as shown in FIG. 6A.

In any case, the configuration of the exercise elements 18 makes the system 1 highly versatile, wherein many exercises can be performed starting from a single exercise element, which allows multiple fastening positions P. At the same time, the deformable material of the exercise elements (for example the elastic material of the work portion of said exercise element) offers a very useful haptic feedback to the operator. The elastic material of the work portion may be the same of different with respect to the elastic material of other portions of the exercise elements. In an embodiment, as shown in FIGS. 6A-6B the whole exercise element 18 is made of a same elastically deformable material. In this embodiment, the ends are stretched, even if also embodiment are possible, as it will be disclosed in the following.

In some cases, the exercise element 18 can be kept hanging inside the space S, for example by insertion of all its ends 18e into the holes 14, as illustrated by way of example in FIG. 6B. This allows an even more realistic simulation to be obtained, encompassing also the most lateral cases which can be encountered in laparoscopy; it also possible to force these exercise elements 18 to assume a twisted conformation, thanks to the soft and elastic body thereof.

In an embodiment of the present disclosure, as mentioned before, at least one end 18e of the exercise element 18 comprises a magnet (e.g., a neodymium magnet) for the fastening thereof inside the exercise space S.

In an embodiment, the exercise element 18 may also comprise at least one elastic thread 25 (which therefore is a portion of said exercise element 18) connected to a respective end 18e thereof for fastening said exercise element 18 to the covering element 13, e.g., for fastening the exercise element by inserting said elastic thread 25 inside the holes 14 of the covering element 13, wherein the fastening is ensured for example by the grip with the bushing elements 16 (Which are also made by a suitable elastic material configured to provide said required grip). In some embodiments, more than one elastic thread 25 may be used, for example two elastic threads 25 at two respective ends 18e (any useful number may be used). The elastic thread 25 may be connected to the end 18e for example by magnetic coupling (e.g., a neodymium magnet), and it may allow the fastening of the exercise element and also a desired configuration of the plurality of configurations, for example by stretching it as desired. In this case, the exercise element 18 comprises a first elastically deformable material (i.e., the material of the body thereof) and a second elastically deformable material (i.e., the material of the elastic thread). In other embodiments, the elastic threads 25 may be made of the same material of the body.

In the context of the present disclosure, the elastic thread 25 is therefore part of the exercise element 18 and, when connected (e.g., via a magnet), it can be seen as part of the body thereof as the prolongation of the ends 18e. In any case, the exercise element 18 may comprise various portions, which are connected to each other to provide all the disclosed advantages. A first portion may comprise the work portion 18p and the ends, the work portion 18p being made of a suitable soft elastic material for the simulated operation of the surgeon, and a second portion may be the elastic thread 25, which is also elastic and can be stretched for fastening the exercise element to the covering element 13. In other embodiments, all the portions (e.g., the work portion and the ends, wherein the elastic threads are not present) are integral to each other; what matters is that the exercise element is such as to be arranged in any desired position in the exercise space S.

In other words, in an embodiment, the exercise element 18 may comprise a portion comprising the work portion (and possibly the ends, which may also be deformable) and a portion comprising the elastic thread that is used for fastening to the covering element, said portions being connected by suitable magnets. The elastic thread is deformed (e.g. stretched) when inserted into the bushing elements 16 of the holes 14, maintain in position the whole exercise element. In this embodiment, the fastening to the base is obtained via the ends. In any case, as already observed also other embodiments may be used.

Advantageously, when the exercise element 18 is fastened to the covering element 13 by means of the ends or the elastic thread and is fastened to the base (e.g., by the magnet), the operator may also cause, during the simulation, the displacement of the exercise element form the rest position, wherein the elastic ends thereof and/or the elastic thread allow an elastic displacement from the rest position (and at the same time it remains fixed at the fastening position P at the base element and at the covering element), as in a real tissue.

Figure 7A:
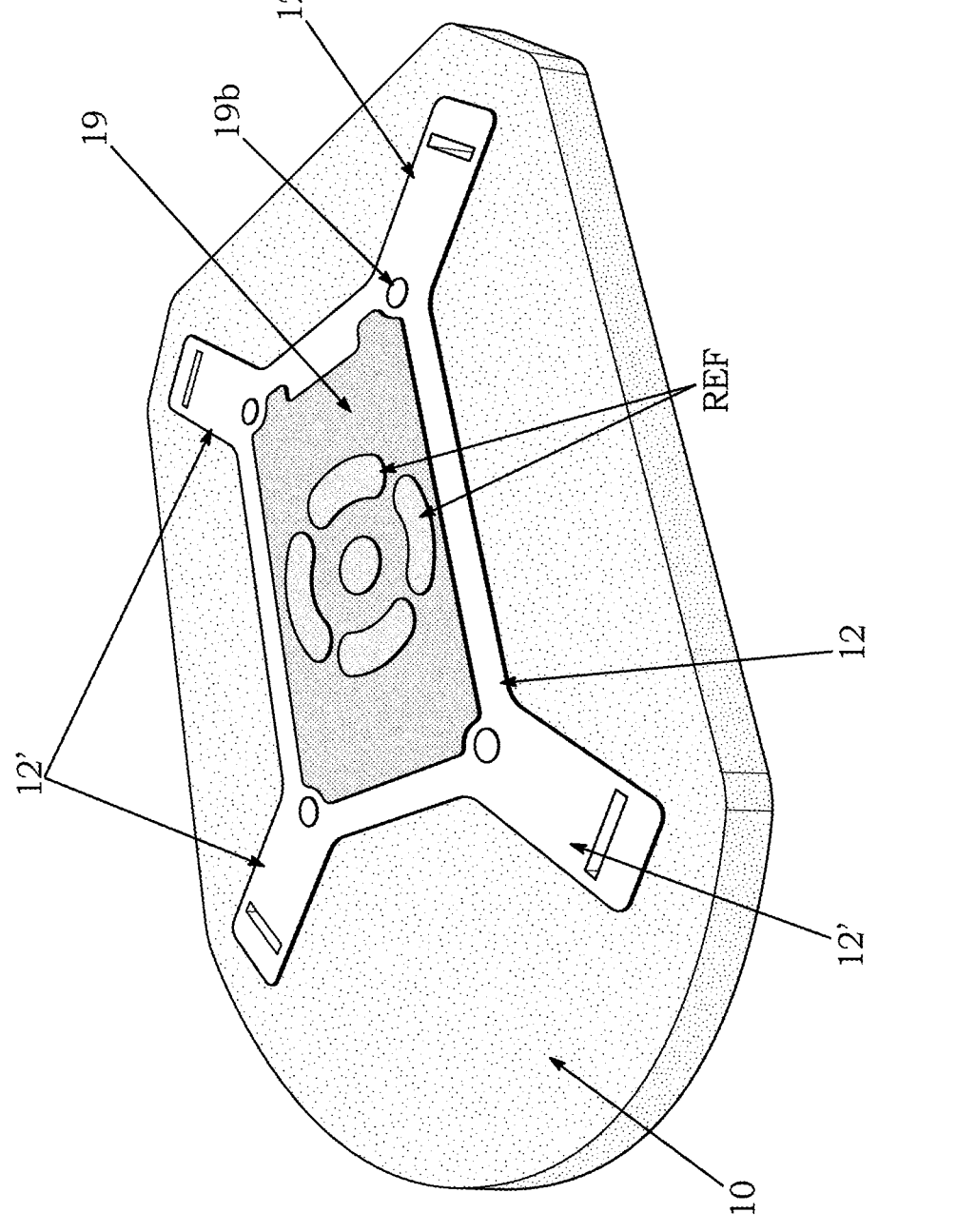
FIG. 7A shows a perspective view of a support base of the system of the present disclosure and of an exercise plate associated therewith.

In an embodiment of the present disclosure, the exercise plate 19 is removably associable with the system 1 (for example associable with the support element 12 through suitable buttons 19b) and it is configured to carry (show) spatial references REF for the correct arrangement of the exercise element 18 inside the space S. FIG. 7A illustrates an example of the exercise plate 19 without limiting in any way the scope of the present disclosure.

The spatial references REF carried on the exercise plate 19 correspond to surgical exercises to be performed by the system 1, wherein the relative position of the holes 14 of the covering element 13 and the arrangement of said spatial references REF is coordinated and is selected to allow a correct access of the surgical instruments T and thus a correct application thereof on the work portion 18p of the exercise element 18 only via certain holes 14.

In other words, the exercise plate 19 carries (shows) visual spatial references REF, which are suitably related to the position of the holes 14, said spatial references REF driving the operator in the arrangement of the exercise elements 18 in the space S; in this way, once these exercise elements 18 are arranged in the system, only some accesses are possible and allow the exercise to be correctly performed (i.e., the exercise can be correctly performed only via certain determined holes 14), while from other accesses it is impossible to correctly perform the exercise.

In this way, the system provides the synergic interaction of three distinct components: the covering element 13, one or more exercise element 18, and the exercise plate 19, which allow only certain surgical accesses based on the selected specific configuration, as indicated by said exercise plate 19.

Suitably, the introduction of the instruments T into specific determined accesses (i.e., only via determined holes 14) allows the correct spatial geometries and the ergonomics to be respected, increasing the realism of the execution of the various movements, and allowing an effective exercise.

In an embodiment, the exercise plate 19 is interchangeable (i.e., a plate with certain references may be exchanged with another plate with other reference) and, it can be easily hooked with a button system 19b to the base 10 or to the support element 12. Each exercise plate is specific for each category of specific exercises which can be integrated in the system 1.

In an embodiment, multiple plates can be provided (for example made of steel) which are integrated in the system by the exercise elements 18 (i.e., by the specific arrangement of said exercise elements 18), which may comprise a magnet at at least one of the ends 18e thereof. In a particular embodiment, as the one illustrated in FIG. 7A, the arrangement of the references REF of the exercise plate 18 is such as to allow different angulations of the exercise elements 18 in the space S (for example by moving the exercise element 18 along each of the shown angular sections, each position corresponding to an ideal surgical access), so that the exercise element 18 can be hit by two surgical instruments T from different accesses with ideal angulations. All this results in a better ergonomics, a better impact angle of the surgical instruments T, a better surgical performance, better outcomes, and a reduction of diseases for the surgeon, such as the diseases linked to a wrong surgical posture.

As indicated above, the integration between the exercise plate 19 and the covering element 13 through the exercise element 18 (i.e., thanks to the arrangement of the exercises element 18 based on the reference REF) is thus provided, wherein it is possible to arrange said exercise element 18 anywhere in the space, also thanks to the grip given by the bushing elements 16 associated with the holes 14.

All this makes the system 1 very versatile and adapted to perform different surgical techniques.

In this way, the interchangeable exercise plate 19 allows multiple integrations of the exercise element 18 inside the exercise space S defined by the covering element 13.

In general, multiple exercise plates 19 can thus be provided, wherein each plate is specific for a certain group of exercises, according to the above-illustrated modes, and each exercise is thus integrated in the system by a specific exercise plate 19. In this regard, it is possible to make an analogy between a CD inserted into a videogame console and the assembly comprising the exercise plate 19 (for example in the form of a polyethylene sheet with different drawings for each single exercise) and the exercise element 18 inserted into the space S inside the covering element 13, wherein the CD corresponds to the assembly of the exercise plate 19 and exercise element 18 which can be integrated in the system in an extremely simple and rapid way, allowing the implementation and execution of various exercises and improving the practising quality.

The position of the holes 14 of the covering element 13 is thus related to the arrangement of the spatial references REF, and said relation is selected to allow only specific surgical accesses via specific holes of the plurality of holes 14 based on the position of the exercise element 18, allowing a correct application of the surgical instruments T on the work portion 18p of the exercise element 18, when said the exercise element 18 is arranged according to said spatial references REF, only via said specific holes of the plurality of holes 14.

Figure 7B:
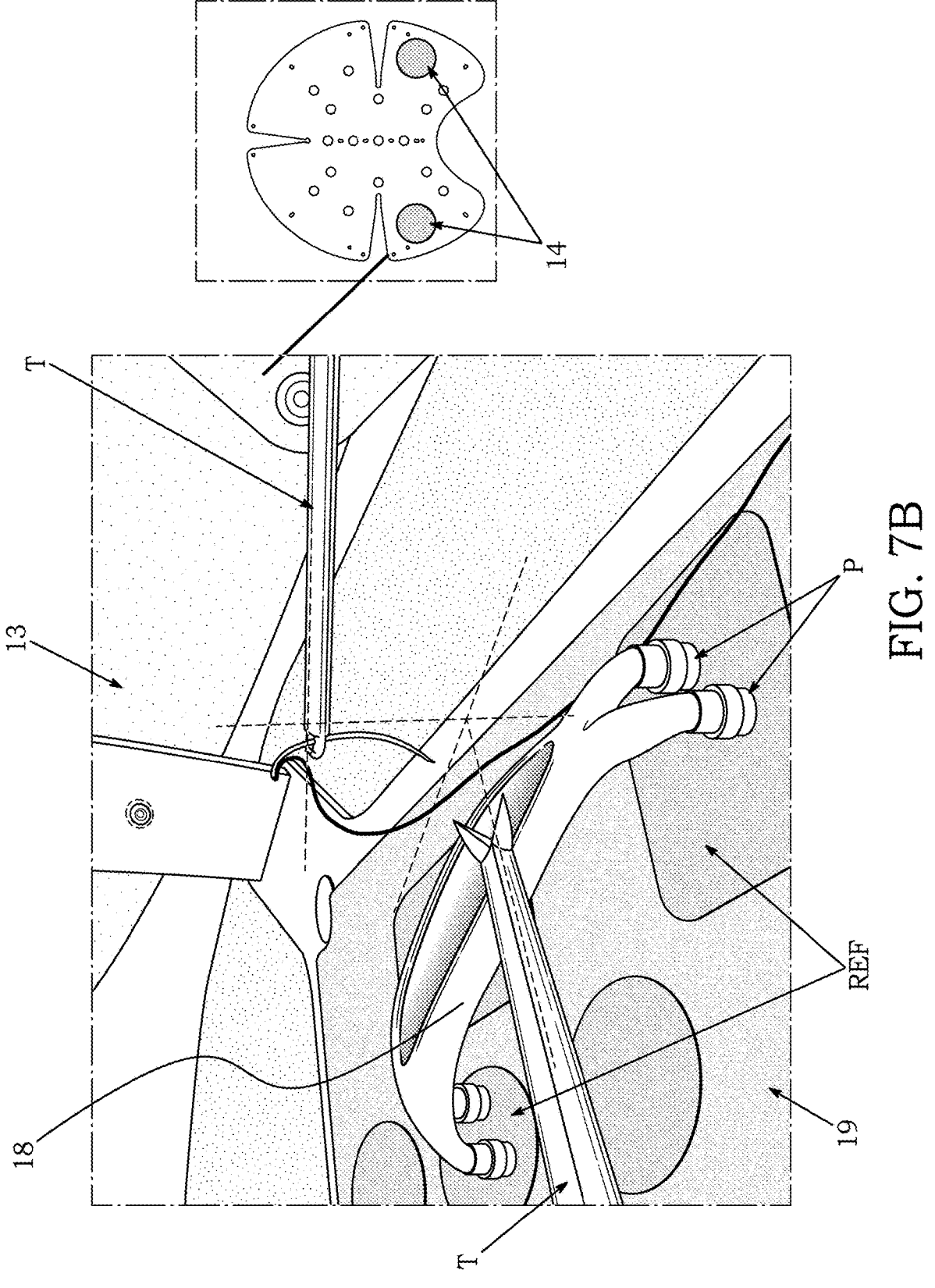
FIGS. 7B-7D show respective different configurations of the exercise element arranged according to spatial references of the exercise plate, corresponding to different exercises to be performed.
Figure 7C:
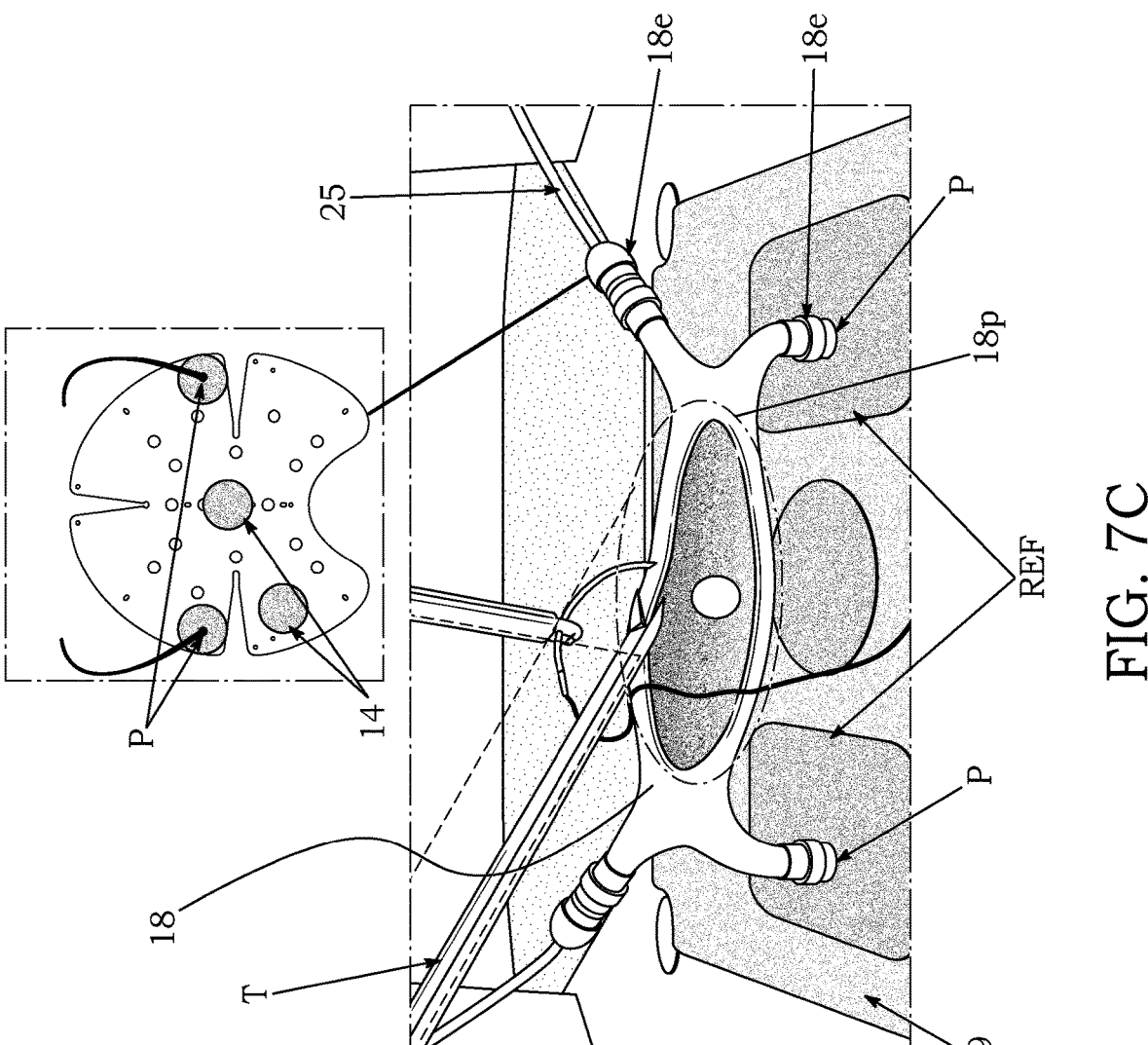
Figure 7D:
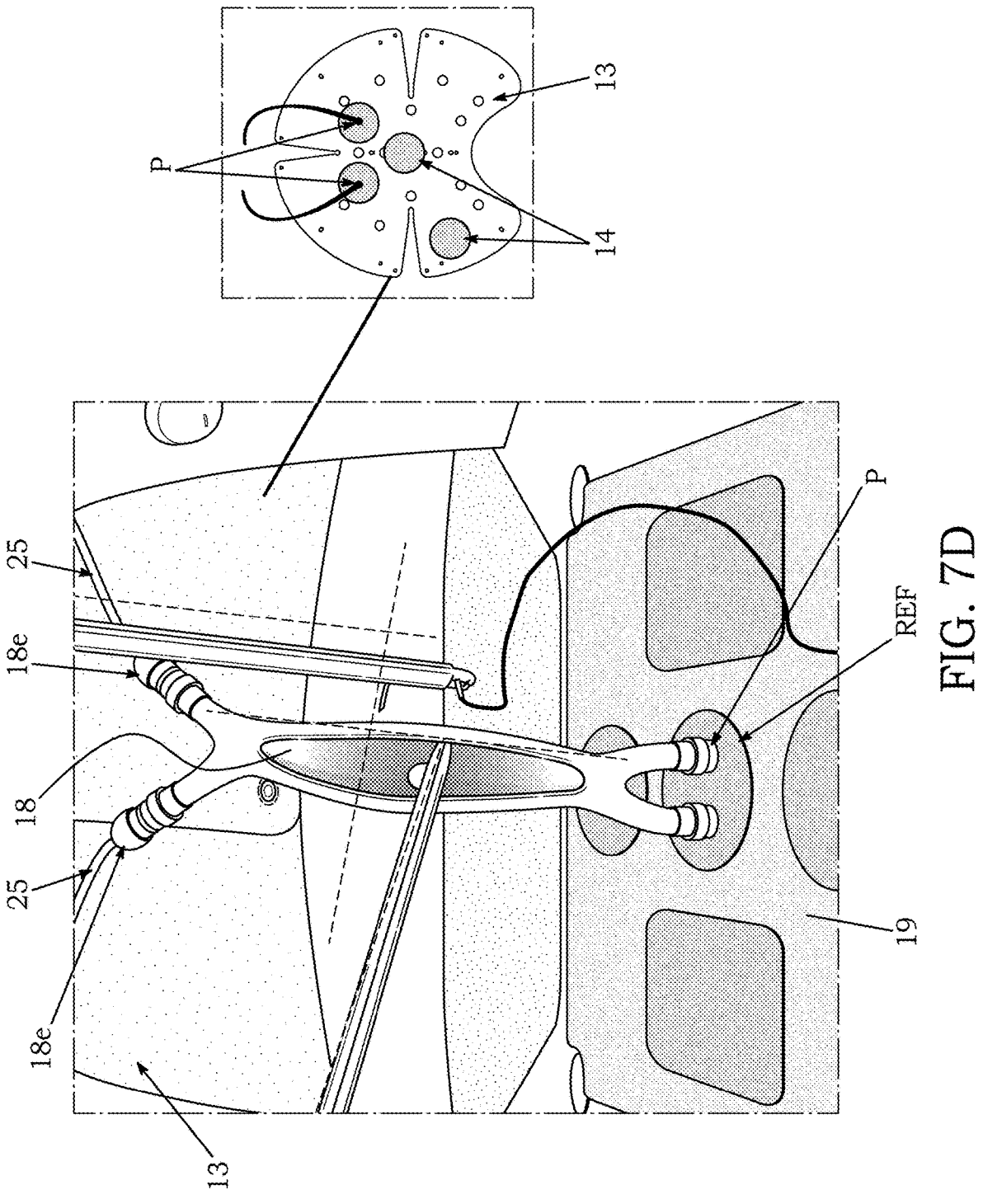

As shown in FIGS. 7B-7D, many configurations are possible. For example, FIG. 7B shows an arrangement of the exercise element 18 for a surgical technique with contralateral access; in this case the integration of the exercise element is only with the base element, wherein the holes for correct impact angle are shown in the right portion of the figure. FIG. 7C shows an arrangement of the exercise element 18 for surgical technique with suprapubic access and horizontal suture; in this case the integration of the exercise element is with the base and the covering element, wherein the holes for correct impact angle are shown in the top portion of the figure, as well as the fastening positions P on the covering element 13. FIG. 7D shows an arrangement of the exercise element 18 for surgical technique with suprapubic access and vertical suture; in this case the integration of the exercise element is with the base and the covering element, wherein the holes for correct impact angle are shown in the right portion of the figure, as well as the fastening positions P on the covering element 13. It is observed that the shape of the exercise element 18 in FIGS. 7B-7D is different from the one of FIGS. 6A-6B but the functionality of said exercise element is the same; the only difference is that in FIGS. 7B-7D part of the end comprises the elastic thread.

In any case, generally, the shape of the exercise element, comprising the work portion and ends protruding therefrom, allows a proper support thereof in the exercise space, also permitting the use of soft elastic materials. In a preferred embodiment, the work portion has an oval shape, and is made of an elastic material (even a soft one thanks to the support of the ends) providing a real tactile feedback.

Obviously, embodiments can also be provided wherein the exercise plate 19 does not provide any reference and serves only as the system base, and the different configurations are selected by positioning as desired the exercise element 18, wherein, in any case, the arrangement of the holes 14 is always selected to simulate realistic situations. Moreover, in some embodiments, the exercise plate 19 is not present. Generally, the references for the exercises to be performed may be provided on a base element of the system 1 (preferably the removable exercise plate but also the support base) in any suitable way, and said references are related to the position of the holes as above described for an easy integration of the exercise elements.

In general, advantageously according to the present disclosure, the position of the holes 14 of the covering element 13 and the arrangement of the exercise element 18 inside the space S defined by the covering element 13 is selected such that only certain accesses allow the exercise to be performed, these accesses being those which respect the real laparoscopic ergonomics. This solution (for which the ergonomics is respected by the technical choice of selecting a relative position of the holes and of the exercise elements which allows only certain accesses) is very advantageous, and in general it can be applied to any type of system, also systems that are not necessarily equipped with a covering element which is switchable between different configurations, as well as it can be used in combination with various types of exercise elements. What matters is that the position of the holes 14 of the covering element 13 is related to the arrangement of the exercise elements 18 (for example by using the exercise plate 19 in the arrangement of said exercise elements 18), and this relation is selected to allow only specific surgical accesses via specific holes of the plurality of holes 14 based on the position of the exercise element 18, allowing a correct application of the surgical instruments T on the work portion 18p of the exercise element 18 only via said specific holes of the plurality of holes 14.

In general, the holes 14 arrangement, the use of the exercise plate 19, as well as the shape/material of the exercise elements 18, are independent from the specific shape, material, and configuration of the covering element 13. It is also clear that the specific shape and material used for the exercise elements 18 is independent from the other features of the system 1.

As mentioned before, according to an embodiment of the present disclosure, the exercise elements 18 (in particular the body—ends included—thereof) are made of polymeric materials, preferably silicone, wherein the shore of the material is selected so as to provide the best performances in terms of configurability and feedback. Also the bushing elements 16 may be made of a special silicone.

In this way, the shape and material of the exercise elements give many advantages and allow them to be placed according to any desired configuration and to provide the proper haptic feedback to the operator. Likewise, the material of the exercise elements and of the bushing elements allows to obtain the proper grip for suitably arranging the exercise elements in the three-dimensional space.

In general, according to the preferred embodiment of the present disclosure as illustrated above, only some surgical accesses are allowed based on the position of the exercise element 18 in the space S, respecting the real correct surgical geometries in order to respect the real requirements of ergonomics, in particular laparoscopic ergonomics, and this solution can be applied to a plurality of configurations.

Figure 8:
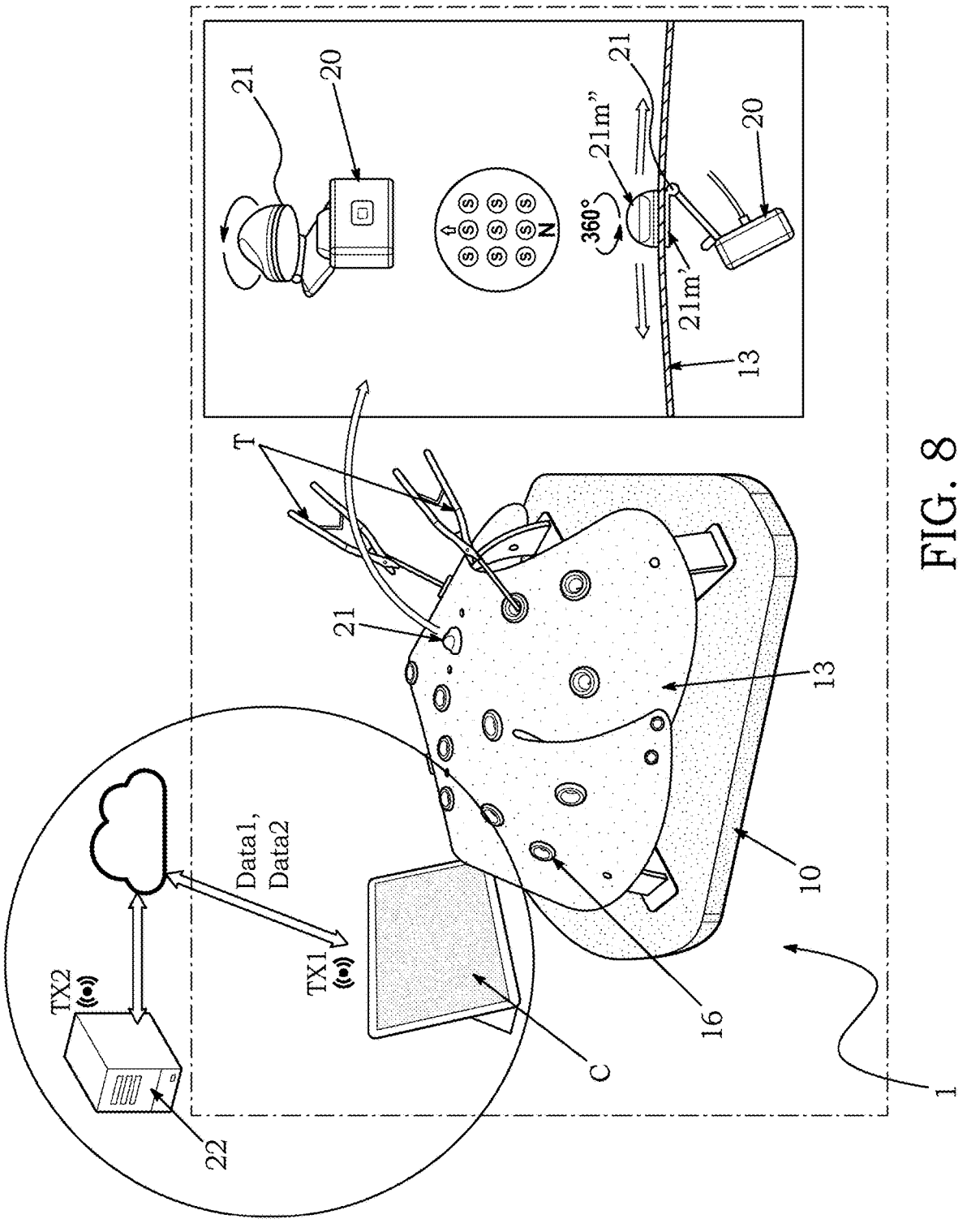
FIG. 8 shows a set of components which form the system of the present disclosure.

Furthermore, referring now to FIG. 8, the system 1 comprises a vision system 20 configured to film and monitor the exercise element 18 inside the space S, for example to capture high-resolution images, frames and videos. The vision system 20 comprises a camera, such as a webcam, which can be installed in the space S inside the covering element 13 for example through a support 21 equipped with magnetic means, so that this camera can be positioned in any position inside the space S.

For example, the camera can be equipped with a support 21 projecting therefrom and having a free end with a magnetic joint which includes a pair of magnets with opposed polarity, wherein a first magnet 21$m'$, connected to the support 21, can be arranged on the inner surface of the covering element 13, while a second magnet 21$m''$ can be arranged on the external surface of the covering element 13 ensuring the fixation and a great freedom of movement of the camera. This allows the camera to be easily moved on the top of the covering element 13, providing for each exercise the best view with the best angle and focus.

Furthermore, advantageously according to the present disclosure, the system 1 comprises a control unit C operatively connected to the vision system 20 and configured to process the captured images.

By way of example, the control unit C can be a laptop, a tablet, a smartphone, or more generally any electronic unit which is apt to process data, preferably a portable unit. In an embodiment, the control unit C is a tablet equipped with a monitor to allow the inside of the covering element 13 to be displayed, and thus to display in real time the execution of a particular exercise in the space S.

In any case, the present disclosure is not limited by a particular architecture of the control unit C, which can be directly connected to the vision system 20 by cables or wirelessly, and it comprise both local units and remote units, as well as only a local unit or only a remote unit. These examples do not limit the scope of the present disclosure, since the control unit C can be any type of computerized unit which operates in any suitable way.

Suitably, the control unit C comprises a memory portion adapted to store code portions of an application developed for managing the system 1, said application allowing first of all to manage the display of the exercises filmed by the vision system 20 and displayed by a monitor of the control unit C, as well as many other functions described hereafter, allowing the user's experience to be optimized.

In a preferred embodiment of the present disclosure, the control unit C is suitably configured (thanks to the execution of the application installed and managed by said control unit C, as it will be illustrated hereafter) to process data and to monitor the closing operation of the recess 18$r$ of the work portion 18$p$ to be sutured by the surgical instruments T during an exercise, so as to evaluate the execution mode of a suture performed by a user on the exercise element 18.

More particularly, in an advantageous embodiment of the present disclosure, the recess 18$r$ has a colour or colour tone which is different from the rest of the body 18$'$ of the exercise element 18. In this way, based on the images captured by the vision system 20, the control unit C is configured (thanks to the execution of instructions of the above application integrated in the memory thereof) to discriminate between the different colours or colour tones and to verify that, during the execution of the suture of the edges 18$s$, the colour of the recess 18$r$ has disappeared, the disappearance of this colour corresponding to the completion of the suture. In order to facilitate the image processing by the control unit C, the recess 18$r$ has a colour that is in strong contrast to the rest of the body 18$'$ of the exercise element 18. In this case, the exercise consists in making one of the coloured parts disappear in the shortest time and with the greatest possible accuracy; in this regard, the control unit C is configured to detect if there is still a minimum residual colour which has not disappeared, indicating an imperfect suture execution, and thus it is also configured to evaluate the accuracy of the exercise performed, as well as the time spent to perform this operation.

Obviously, although the above embodiment is considered as the preferred one, the system 1 of the present disclosure can be configured to recognize other visual features besides the colour of the exercise elements 18, such as for example a particular type of material or surface roughness; what matter is that the control unit C is apt to evaluate, based on the captured images, whether a suture was completed or not, as well as the time spent and the accuracy of this suture.

Figure 9:
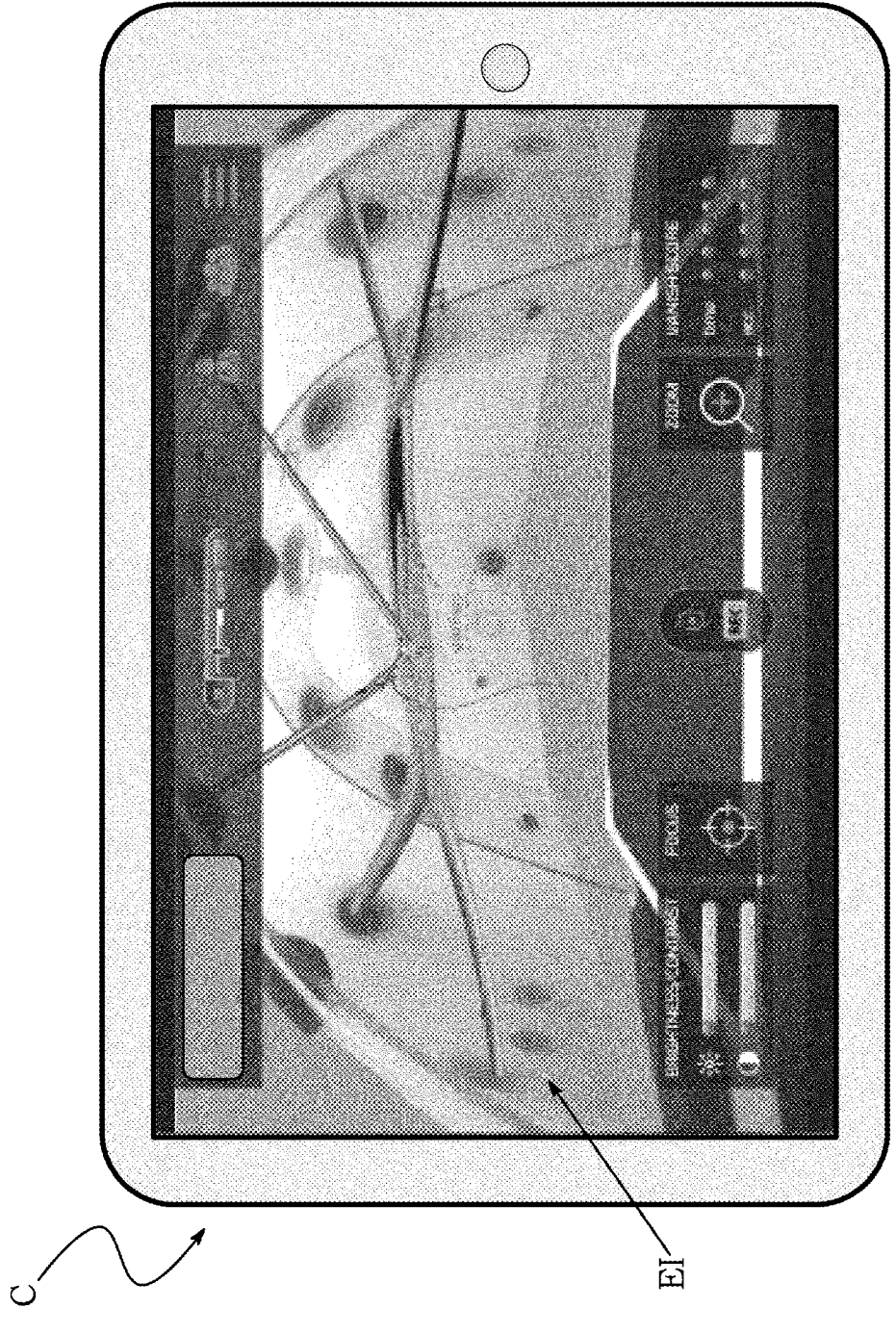
FIG. 9 shows an example of interface generated by the system of the present disclosure.

Advantageously, the control unit C is configured to allow the access to an exercise interface EI generated by the above application and shown by way of example in FIG. 9. Through this exercise interface EI, the user is able to see the inside of the system and different options are available to him. The exercise interface EI allows to interact with the system 1 (for example by inserting and/or displaying information) and it further allows the exercise execution inside the space S to be displayed. The exercise interface EI can further comprise various selection and display windows, as well as selection menus.

Referring again to FIG. 8, in an embodiment of the present disclosure, the control unit C is configured to perform an operational communication with a server 22, and is configured to send to this server 22 data (indicated as Data1 in the figure) relating to the exercise performed in the space S. It is thereby possible to share this data over the network with other users who perform the same exercises. It is also possible to receive data (indicated as Data2) relating to an exercise of other users on a remote system and to display this data on the exercise interface EI. To this end, the control unit C comprises reception/transmission means TX1 (for example wireless means) configured to receive data from and/or send data to the remote server 22 (which is equipped with reception/transmission means TX2) which forms together with said control unit C the overall management system of the present disclosure. The data of the exercises can be stored in a database associated with the server 22 (connected thereto or resident therein).

The data uploaded over the network by the control unit C (for example through the application executed by this control unit C) can thus be shared by a community of users, this data being displayable or downloadable at any time, also on a smartphone in which said application is installed. Moreover, any smartphone or tablet of a user can act as a control unit C if the dedicated application is installed therein, which considerably simplifies the system 1.

Each user of the system 1 can thus access the exercise interface EI (and possibly the server 22 which allows the access to the web platform form sharing data) for example by launching the application installed and executed in the control unit C (or also through an Internet address entered through the control unit C). In any case, the user accesses the exercise interface EI which allows the interaction with the system 1 and the data sharing with the community of users.

Moreover, it is possible to store in the database, which the plurality of users can access, its own profile with its own data, so as to keep a history of the exercises. It is obviously possible to store its own profile also in a local memory of the control unit C. In general, the control unit C is thus suitably configured to allow accessing the platform to share exercise data.

Advantageously, it is thus possible to share the data relating to the suture execution (and more generally the data relating to the exercise) as evaluated by the control unit C based on the captured images, creating a community of users who can have a reliable feedback in relation to their own performance and share their results. This allows to create a set of data obtained thanks to the contribution of the users of the system 1, and this data can be used to define new standards in the learning curve of the laparoscopic surgery.

The system 1 of the present disclosure can thus be a peripheral device among a plurality of peripheral devices (i.e., remote systems) which can be interfaced with a platform on which the exercise data are shared, for example by the control units of said peripheral devices.

In an embodiment, the exercise filmed by the camera is recorded by means of the application and shared among the community of users.

In this way, according to the disclosure, physical training combines with e-learning in a very effective way.

Moreover, the above-described advantageous feature, which allows the analysis of the execution of an exercise and the possible sharing thereof with a community of users, can be applied to various systems having various structures, and thus not necessarily having a covering element 13 and an exercise element 18 shaped as illustrated above, i.e., it can be generally applied to a plurality of configurations which generally comprise a covering element and exercise elements housed therein.

In summary, the present disclosure thus provides a set or kit of components, in which the surgical instruments T are also included, such as for example laparoscopic forceps, for performing exercises through this system 1. Obviously, the control unit C operatively connected to the vision system 20 may also be included.

Figure 10:
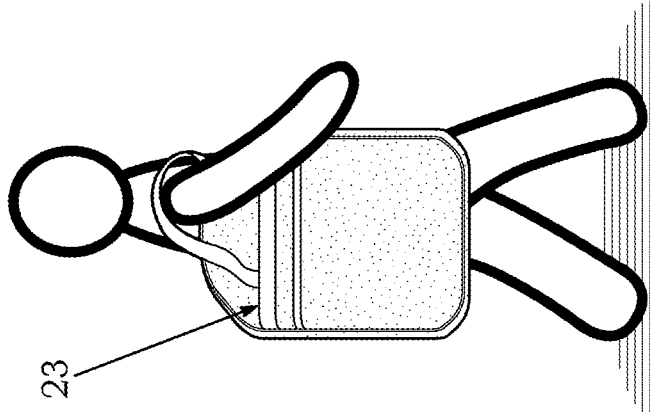
FIG. 10 shows a case adapted to contain the system of the present disclosure.
Figure 10:
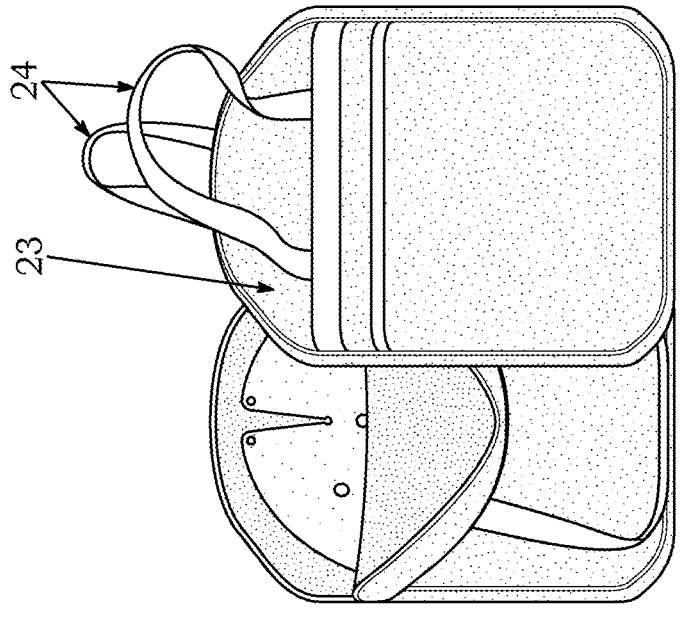

As illustrated in FIG. 10, a case 23 is provided, said case 23 being configured to contain the above components and being equipped with means, such as one or more handles 24, for conveniently transporting them. As described above, the system 1 is easily foldable and transportable inside the case 23.

The method for assembling the system 1 is thus extremely simples and it comprises at least the steps of:

- providing an essentially two-dimensional plate (or sheet) 13' equipped with holes 14;
- folding said plate 13' so as to form a covering element 13 having a three-dimensional structure which defines an exercise space S at the inside thereof;
- arranging at least one exercise element 18 in the space S, this exercise element 18 having a body 18' which extends three-dimensionally in the space S and comprises a work portion 18$p$ on which the surgical instruments T (which are introduced in the holes 14) acts, wherein the exercise element 18 is arranged in the space S according to a plurality of three-dimensional configurations in which said work portion 18$p$ assumes a corresponding plurality of orientations in the three dimensions of said space S, allowing a plurality of exercises.

Moreover, complex moulding techniques are not used, but the simple CAD CAM cutting of plates/sheets (laser cutting), for example polymeric plates, is performed.

In conclusion, the present disclosure provides a system having an interlocking and modular structure which includes components which can be easily combined with each other, so as to be easily assembled starting from elements (such as for example thin two-dimensional plates) which can be easily manipulated in order to form a structure having a three-dimensional cap, and vice versa, thereby obtaining a portable simulator which is able to faithfully reproduce a patient's anatomic portion, particularly the patient's abdomen. The disclosed system is able to house at the inside thereof exercise elements (such as for example elastically deformable components) to be sutured by means of surgical instruments introduced through holes suitably made on the cap, the position and the relative spatial relation of the holes corresponding to the real access ways or routes which occur in the main laparoscopic surgery cases. The exercise elements are configured to be arranged at will by exploiting each direction in the three-dimensional space defined inside the cap, for example by exploiting the elasticity thereof as well as the possibility of using the holes of the cap for fastening them, thus assuming a plurality of three-dimensional configurations in the space which allow a plurality of exercises. In this way, a portable system is obtained which simultaneously provides an extremely realistic experience for the operator, allowing a plurality of exercises on real cases to be performed thanks to the studied ergonomics of the components thereof and to the versatility of the arrangement of the exercise elements to be sutured.

Advantageously according to the present disclosure, a simulator for performing laparoscopic surgery practical exercises is obtained; this simulator is portable and can be easily and rapidly assembled and can thus easily transported from one place to the other, without need to be used in specialized structures, offering anyone the possibility of practising as realistically as possible. Thanks to the possibility of passing from the transport configuration to the operational configuration by simply folding and fastening single plates to each other (through an operation which requires a very little time), limited-sized and light components can be used, which can be inserted and transported in a simple case.

The disclosed system is low-cost since it does not require a complex equipment, but it is at the same time extremely efficient and versatile, offering all the functions of high-fidelity systems existing on the market, while maintaining a limited cost. Indeed, with respect to high-fidelity systems, the ergonomic components used and the adopted arrangement of said components, which respect the correct ergonomics, allow an even more efficient and realistic simulation.

The high transportability is advantageous both for the single operators who want to practise at home, and for the organizers of common exercise sessions, reducing the time and costs for preparing the sessions.

The transportability of the system is obtained without sacrificing the strength thereof, wherein the materials used are such as to ensure a long useful life of the whole equipment, as well as the components of this system are configured to form a solid and strong capped structure, similar to a tensile structure. The materials used are able to withstand external stresses without altering the structure and, in case of damage, they are in any case easily replaceable.

Moreover, the system can be easily adjusted to the needs of single users, thanks to the confirmation of the exercise elements, permitting a great versatility and being adapted to perform any laparoscopy technique.

The present disclosure thus provides a versatile training system, for example for executing sutures in laparoscopy, which allows multiple positioning choices of the exercise elements, and thus the use of multiple accesses which are different for each different suturing technique, wherein there is a three-dimensional exploitation of the space, also exploiting the most lateral arrangements.

Advantageously, an extremely realistic laparoscopic surgery simulation is provided thanks to the ergonomic design of the structure and to the elasticity of the materials. The materials, size and proportions are in fact selected to respect the ergonomics and obtain an experience which is as real as possible; for example, the system ensures the correct relative distance of the surgical accesses, as well as the correct volume defined by the covering element with respect to the fulcrum of the instruments is ensured. The instruments are thus always interfaced with the correct geometries (axes and angles, such as suture angles) with respect to the holes of the covering element, allowing a correct and effective use of the system without the supervision of a tutor.

This is facilitated by the presence of the exercise plate which allows the correct positioning of the exercise elements inside the covering element based on the carried references, wherein the references which are shown on the plate and the position of the exercise element are suitably related with the position of the holes, respecting the real surgical geometries and the ergonomic requirements (i.e., the access points substantially maintain the same positions as the real ones).

In general, the present disclosure provides that the holes of the covering element simulate the real surgical accesses and are configured to allow a correct execution of the exercise only through specific accesses.

This is particularly important in laparoscopy, where a wrong posture and movements can cause discomfort to the surgeons and, even worse, inefficiency: then, the system of the present disclosure is configured (thanks to the design of the geometry of the components and accesses) so as to make the operators operate always respecting the ergonomics.

The exercise elements to be sutured are interfaced in a simple and effective way, thanks to the possibility of arranging them according to multiple three-dimensional configurations, also exploiting the grip offered by the bushing elements housed in the holes of the covering element. At this regard, the material (and possibly the shape) of these bushing elements, as well as the material of the exercise element, are suitably designed to allow the best grip for the arrangement of said exercises element in the exercise space, and in general the best simulation experience. Advantageously, polymeric materials are used.

The possibility of obtaining a tactile feedback and a perfect control of the surgical instruments thanks to the materials used for the bushing elements and for the exercise elements is particularly advantageous, wherein the selection of the polymers type, size, thickness and density provides a realistic simulation, with stereotaxy which is similar to the real one inside the abdomen and fulcrum effect taken into account, so that the use of specific materials is optimized for each specific function thereof.

The shape and material of the exercise elements also allow their multiple arrangement configurations in the exercise space, wherein a portion thereof may be fastened to the base element and another portion (an end thereof and/or the elastic thread thereof) may be fastened to the covering element (e.g., said portion may be inserted into the holes of the covering element), and generally they can be modelled according to the exercise to be performed.

There are different placement options for the exercise element within the system, yielding multiple combinations for different exercises. In fact, the shape and the material of the exercise element allows the operator to put it in any position inside the system. In an embodiment, the magnets at the ends thereof make it possible to connect with both the base element and the covering element, wherein the interchangeable exercise plate allows multiple integrations within the exercise space, and an easy integration of the base element with the covering element. In other words, the exercise element may be integrated with the base element and with the covering element in the exercise space in a very easy and effective way, with many configurations possible.

The system of the present disclosure thus allows infinite combinations of exercises, together with the right numbers and position of accesses, the right feeling and volume. In this way, the exercise element can be placed according to all the coordinate of the exercise space in a very easy way, allowing the simulation of many real surgical cases.

The material (e.g., a special silicone) of the exercise element makes it suitable to be sutured with sutures in all the three-dimensional coordinates of the exercise space (also vertical and horizontal) with realistic tactile feedback. In some embodiments, other element may be placed in the work portion, for example said work portion may comprise a hole (e.g., 1 mm hole) s to position further exercises for dissection and suture.

The internal space is optimized for the use of laparoscopic instruments, and features like fulcrum effect, movement control, wide range of movement, a real surgical ergonomics have been carefully reproduced.

Furthermore, the possibility of evaluating the execution time and mode of a suture, particularly the accuracy thereof, is very advantageous and allows the learning curve of the users to be improved. Thanks to a dedicated and appropriately developed application which can be executed by the control unit, the system allows the results of the exercise to be displayed and shared on a web platform, forming a community of users who use this system.

In this way, a visual recognition-self assessment score system validation may be implemented. For example, for a correct execution of the exercise, the surgical knot performed at the work portion of the exercise element must hold and a coloured part (for example a white dot) has to disappear, with evaluation of accuracy (for instance two surgical knots have to be parallel and positioned 2 cm apart) and of the time spent to perform the exercise.

The disclosed system thus overcomes all the drawbacks of the prior art, reproducing, in shape and volume, a real-sized human abdomen for the insertion of the appropriate laparoscopic instruments. The elasticity of the materials used is such to reproduce the elasticity of a real abdomen, in particular after the insertion of $CO_2$, allowing a realistic experience thanks to the ergonomic design of the structure.

Summing up, an aspect of the disclosure relates to a portable system for performing surgery practical exercises, comprising a base element, a covering element provided with holes for allowing the passage of surgical instruments therethrough, said covering element defining an exercise space at the inside thereof, and at least one exercise element configured to be arranged and kept in the exercise space, said at least one exercise element having a body which extends in the exercise space and comprises at least one work portion for the operation by means of the surgical instruments, wherein the at least one exercise element is configured to be arranged in the exercise space according to a plurality of three-dimensional configurations in which said work portion assumes a corresponding plurality of orientations in the directions of said exercise space, thereby allowing a plurality of exercises, each three-dimensional configuration comprising one or more specific fastening positions of said exercise element in the space, and wherein the exercise element is configured to be connected to the base element and to the covering element according to fastening positions which are located at said base element and at said covering element and are selected based on the exercise to be performed in said exercise space.

The disclosure also relates to a portable system for performing surgery practical exercises, comprising a base element, a covering element provided with holes for allowing the passage of surgical instruments therethrough, said covering element defining an exercise space at the inside thereof, and at least one exercise element configured to be arranged and kept in the exercise space, said at least one exercise element having a body which extends in the exercise space and comprises at least one work portion for the operation by means of the surgical instruments, wherein the at least one exercise element is configured to be arranged in the exercise space according to a plurality of three-dimensional configurations in which said work portion assumes a corresponding plurality of orientations in the directions of said exercise space, thereby allowing a plurality of exercises, and wherein the base element is an exercise plate (which may be removably associated with said system) which is configured to show spatial references for arranging the exercise element inside the space, said spatial references corresponding to surgical exercises to be performed in said system, wherein the position of the holes of the covering element is related to the arrangement of the spatial references and said relation is selected to allow only specific surgical accesses via specific holes based on the position of the exercise element arranged according to said spatial references, allowing a correct application of the surgical instruments on the work portion of the exercise element only via said specific holes when the exercise element is arranged according to said spatial references. Therefore, the various fastening positions to the base element may vary according to the particular exercise plate used.

All the above-mentioned features (for example the switchable covering element) can be combined when needed.

From the foregoing it will be appreciated that, although specific embodiments of the disclosure have been described herein for purposes of illustration, various modifications may be made without deviating from the spirit and scope of the disclosure, all included in the protection scope as defined by the appended claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A portable system for performing surgery practical exercises, comprising:

a base element;

a covering element (13) provided with holes (14) for allowing the passage of surgical instruments (T) therethrough, the covering element (13) defining an exercise space (S) at the inside thereof, and at least one exercise element (18) configured to be arranged and kept in the exercise space (S), the at least one exercise element (18) having a body (18') which extends in the exercise space (S) and comprises at least one work portion (18p) for the operation by means of the surgical instruments (T), wherein the at least one exercise element (18) is configured to be arranged in the exercise space (S) according to a plurality of three-dimensional configurations in which the work portion (18p) assumes a corresponding plurality of orientations in the directions of the exercise space (S), thereby allowing a plurality of exercises, each three-dimensional configuration comprising one or more specific fastening positions (P) of the exercise element (18), and wherein the exercise element (18) is configured to be connected to the base element and to the covering element (13) according to fastening positions (P) which are located at the base element and at the covering element (13) and are selected based on the exercise to be performed in the exercise space (S); and an exercise plate arranged in the exercise space and defining the base element of the exercise space; and wherein the exercise plate is removably associated with said system and is configured to show spatial references for arranging the exercise element inside the exercise space, the spatial references corresponding to surgical exercises to be performed in the system, wherein the position of the holes of the covering element is related to the arrangement of the spatial references and said relation is selected to allow only specific surgical accesses via specific holes based on the position of the exercise element arranged according to said spatial references, allowing a correct application of the surgical instruments on the work portion of the exercise element only via said specific holes when the exercise element is arranged according to said spatial references.

2. The system of claim 1, wherein, based on the exercise to be performed, the fastening positions of the exercise element are only at the base element, or only at the covering element, or both at the base element and at the covering element.

3. The system of claim 1, wherein the work portion of the exercise element is shaped to be sutured by means of the surgical instruments to be inserted in the holes of the covering element, said work portion to be sutured comprising at least one recess which separates from each other edges adapted to be sutured.

4. The system of claim 1, wherein the exercise element is configured to undergo a plurality of different tensile stresses.

5. The system of claim 1, wherein the exercise element is at least partially made of an elastically deformable material and is configured to assume, via deformation of at least one portion thereof, a specific three-dimensional configuration of the plurality of three-dimensional configurations in the exercise space.

6. The system of claim 1, wherein the exercise element comprises a plurality of ends which are independent from each other and configured to allow the housing of the exercise element in the exercise space.

7. The system of claim 6, wherein at least one end of the exercise element is configured to be inserted in one of the holes of the covering element for the housing of the exercise element in the exercise space, and/or wherein the exercise element is maintained hanging inside the exercise space.

8. The system according to claim 1, wherein the exercise plate is configured to provide an abutment plane for the exercise element, and the exercise plate is at least partially made according to a hook-and-loop configuration, or wherein the exercise plate is configured to provide an abutment plane for the exercise element, and the exercise element is coupled thereto by magnetic coupling.

9. The system of claim 1, wherein the holes of the covering element house respective bushing elements provided with openings configured to allow the passage of the surgical instruments and a simultaneous elastic holding thereof.

10. The system of claim 1, wherein the covering element is shaped as a patient's abdomen in the operational conditions of laparoscopic surgery, and wherein the arrangement of the holes of the covering element matches the main surgical accesses of the laparoscopic surgery, the holes being arranged to each other such that specific accesses correspond to specific laparoscopic exercises.

11. The system of claim 1, comprising a vision system configured to monitor the exercise element inside the exercise space and to capture images and/or video.

12. The system of claim 11, comprising a control unit operatively connected to the vision system and configured to process the images captured by the vision system, and, based on the captured images, configured to monitor the closing operation of the recess of the work portion to be sutured via the surgical instruments, so as to estimate the execution of a suture performed on the exercise element.

13. The system of claim 12, wherein the recess has a colour or a colour tone different with respect to the rest of the body of the exercise element, and wherein, based on the images captured by the vision system, the control unit is configured to discriminate between the different colours or colour tones of the exercise element and to verify whether the colour or colour tone of the recess is disappeared, the disappearance of the colour or colour tone corresponding to the completion of the suture.

14. The system of claim 12, wherein the control unit is configured to allow the access to an exercise interface adapted to send data related to the exercise performed in the exercise space for sharing said data over the network, and/or for receiving data related to an exercise performed by other users on another system.

15. The system of claim 1, wherein the covering element is configured to switch from an operational configuration, in which it has a three-dimensional structure and defines the exercise space, to a transport configuration, in which the exercise space is substantially cancelled or at least reduced with respect to the operational configuration, and vice versa.

16. The system of claim 15, further comprising:

at least one surgical instrument for performing exercises in the system; and a case provided with transport means of the system, wherein said the system is configured to be foldable and transportable inside the case when the covering element is in the transport configuration.

* * * * *